(12) United States Patent
Cohen

(10) Patent No.: US 11,018,587 B2
(45) Date of Patent: May 25, 2021

(54) METHODS AND APPARATUS TO REDUCE SWITCHING LOSSES IN POWER CONVERTERS

(71) Applicant: Texas Instruments Incorporated, Dallas, TX (US)

(72) Inventor: Isaac Cohen, Dix Hills, NY (US)

(73) Assignee: TEXAS INSTRUMENTS INCORPORATED, Dallas, TX (US)

(*) Notice: Subject to any disclaimer, the term of this patent is extended or adjusted under 35 U.S.C. 154(b) by 0 days.

(21) Appl. No.: 16/510,625

(22) Filed: Jul. 12, 2019

(65) Prior Publication Data

US 2021/0013807 A1  Jan. 14, 2021

(51) Int. Cl.
*H02M 3/158* (2006.01)
*H02M 1/00* (2006.01)

(52) U.S. Cl.
CPC .......... *H02M 3/1582* (2013.01); *H02M 3/158* (2013.01); *H02M 2001/0054* (2013.01)

(58) Field of Classification Search
CPC .......................................... H02M 3/155–1588
See application file for complete search history.

(56) References Cited

U.S. PATENT DOCUMENTS

| | | | | |
|---|---|---|---|---|
| 2010/0134085 A1* | 6/2010 | Nishida | ............... | H02M 3/1563 323/285 |
| 2010/0148587 A1* | 6/2010 | Khaligh | .................. | H02M 1/10 307/72 |
| 2012/0229111 A1* | 9/2012 | Serdarevic | .......... | H02M 3/1582 323/282 |
| 2014/0159688 A1* | 6/2014 | Peker | .................. | H02M 3/1582 323/282 |
| 2015/0061540 A1* | 3/2015 | Park | .................... | H02M 3/1588 315/294 |
| 2017/0012526 A1* | 1/2017 | Chen | ....................... | H02M 1/38 |
| 2019/0089242 A1* | 3/2019 | Iijima | ....................... | G05F 1/70 |
| 2019/0288601 A1* | 9/2019 | Sun | ......................... | H02M 1/08 |

* cited by examiner

*Primary Examiner* — Peter M Novak
*Assistant Examiner* — Thienvu V Tran
(74) *Attorney, Agent, or Firm* — Mark Allen Valetti; Charles A. Brill; Frank D. Cimino

(57) ABSTRACT

Methods, apparatus, systems and articles of manufacture are disclosed to reduce switching losses occurring in power converters. An example a converter including an input voltage node and an output voltage node, a controller coupled to the converter, and a compensation network coupled to the converter and to the controller, the compensation network adapted to conduct a current to the converter in response monitoring a first voltage at the input voltage node being a threshold difference than a second voltage at the output voltage node.

13 Claims, 12 Drawing Sheets

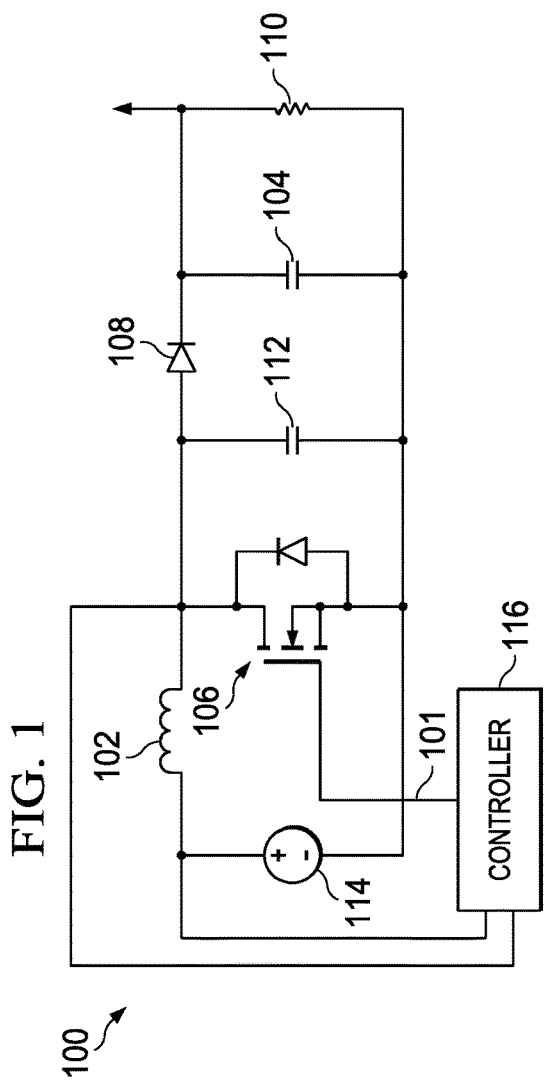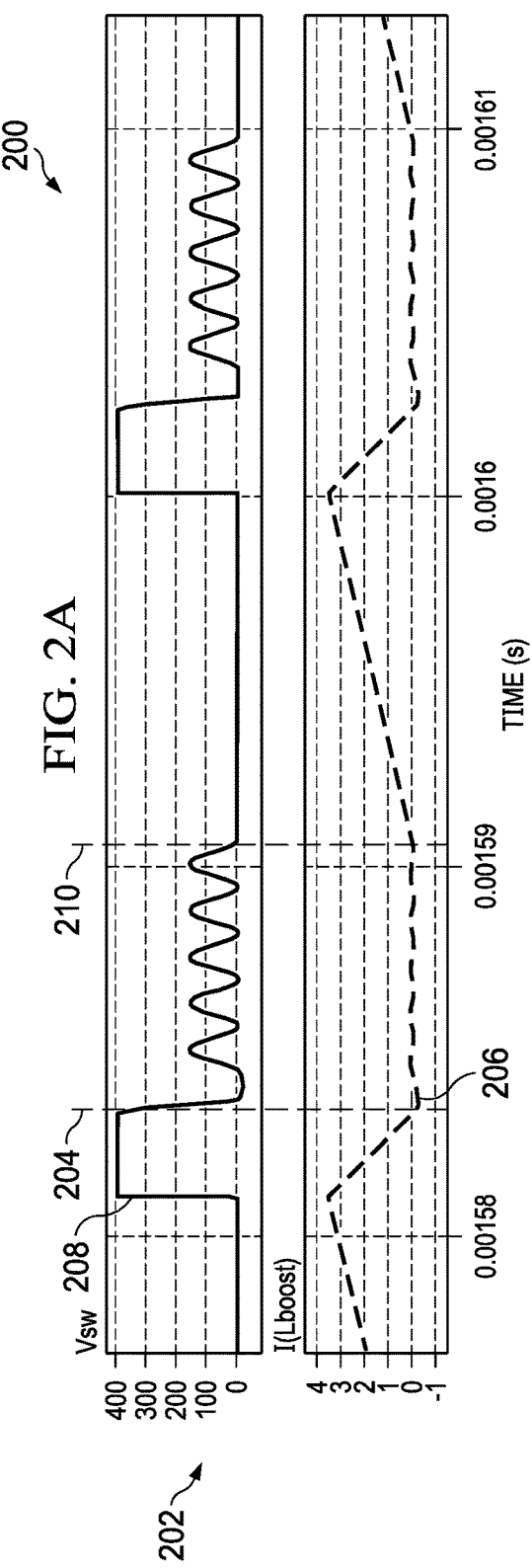

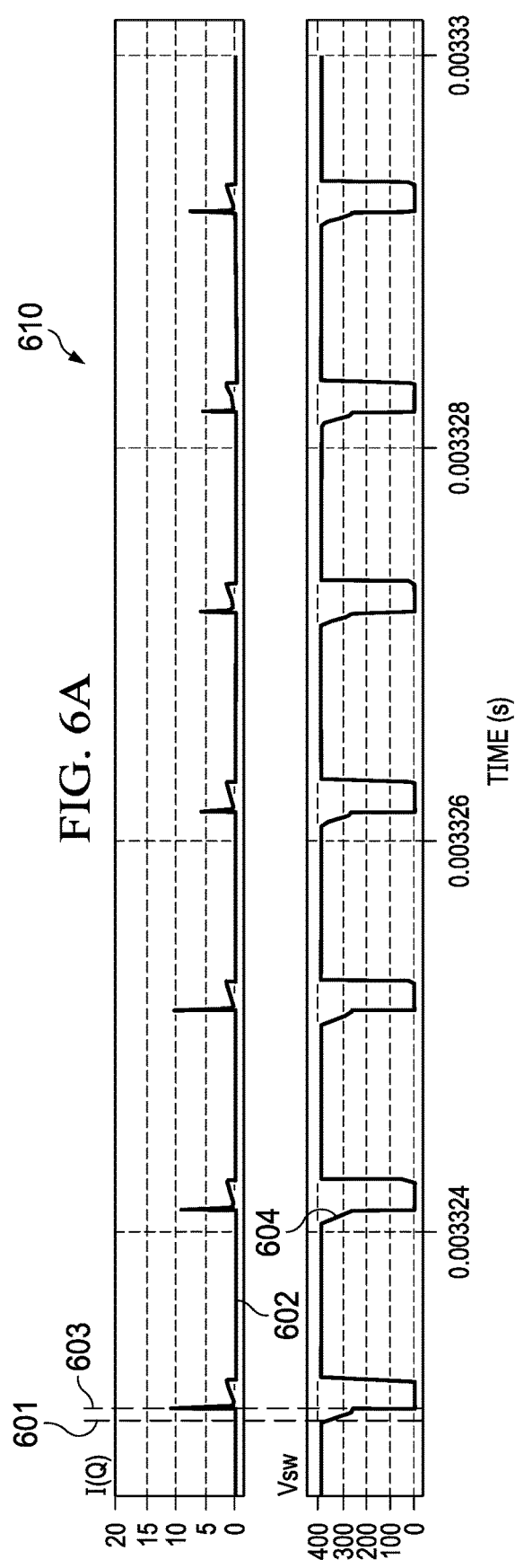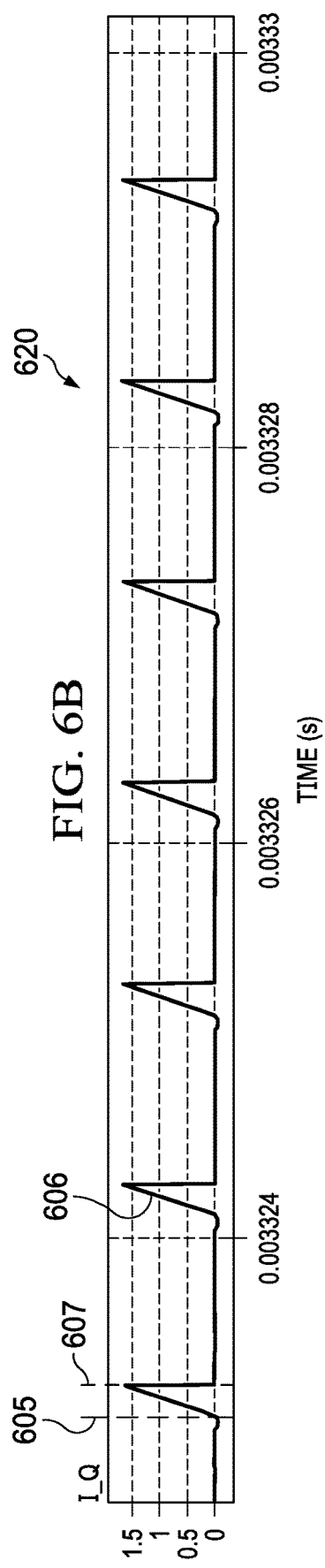

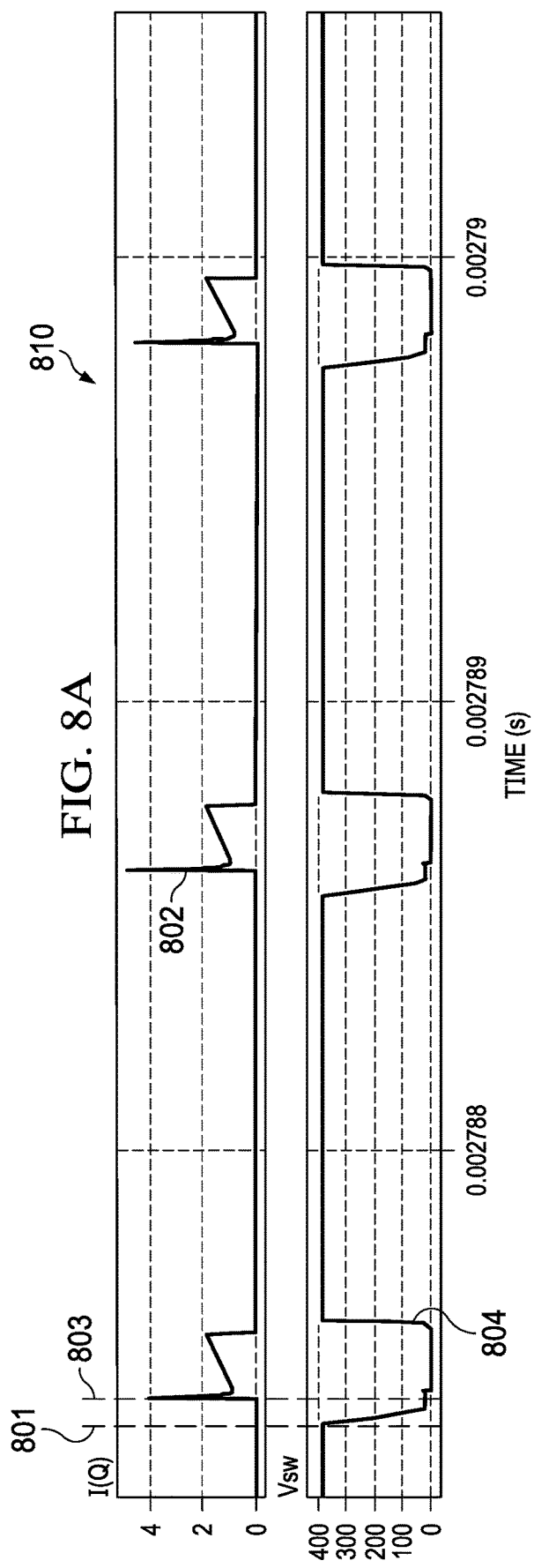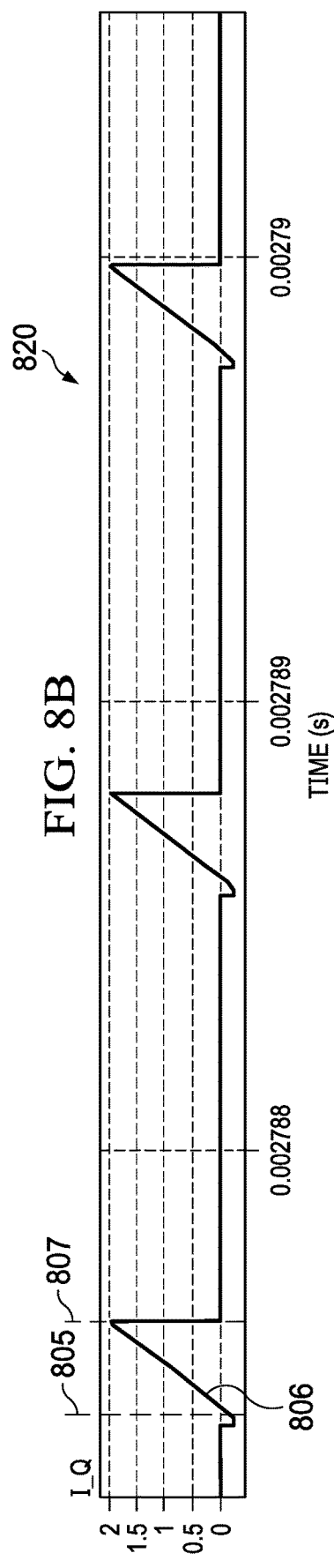

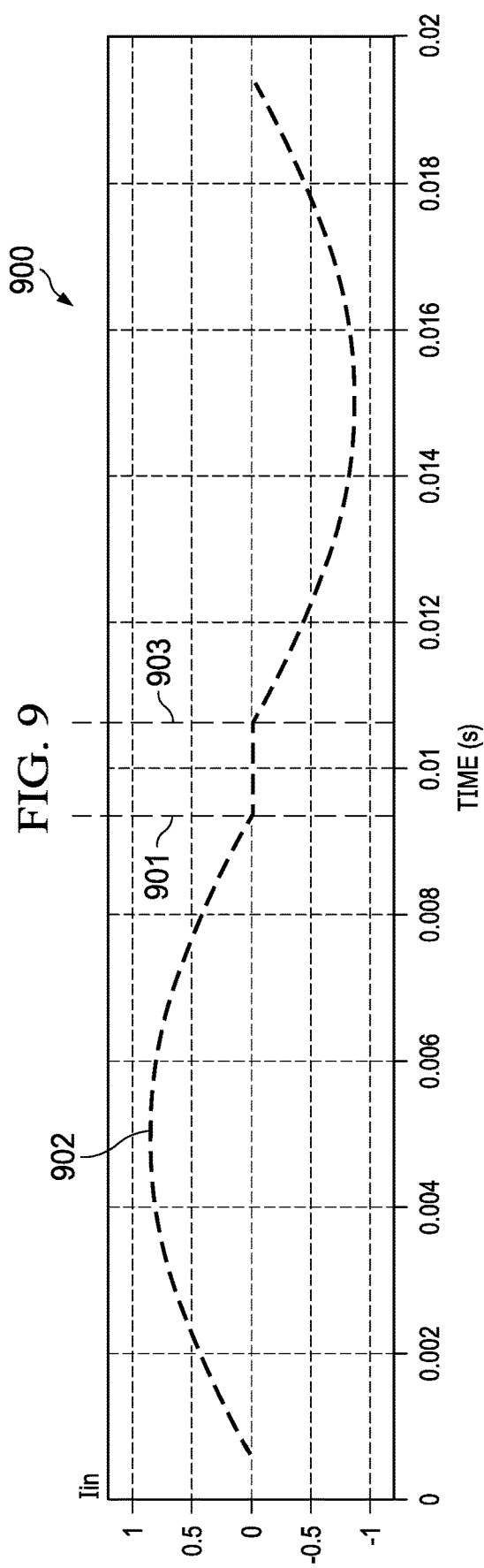
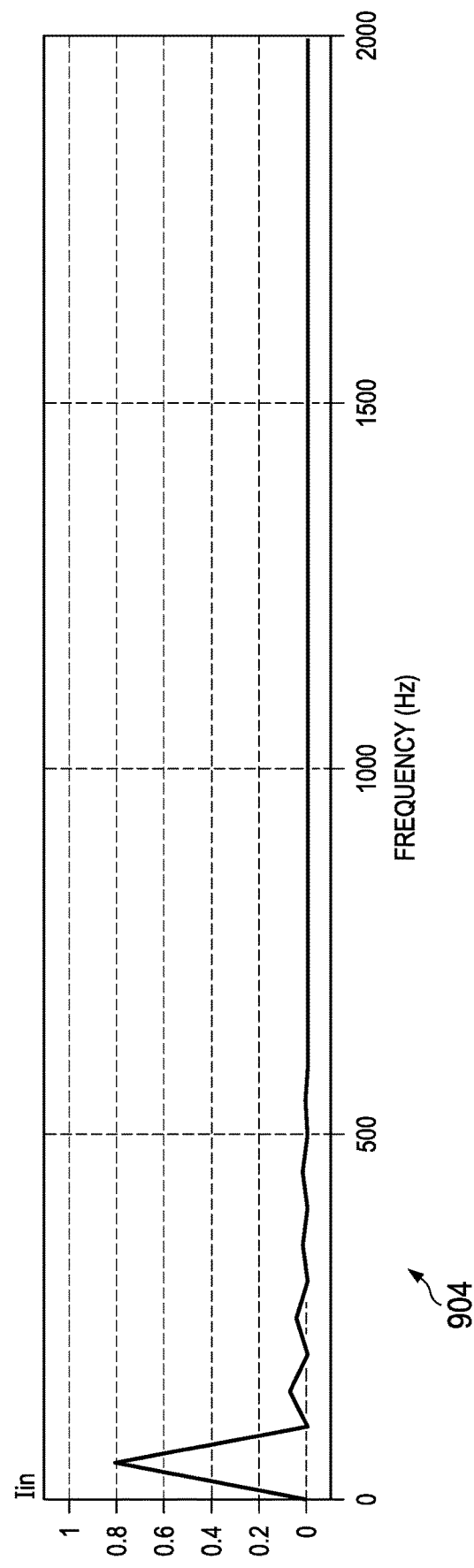
FIG. 9

US 11,018,587 B2

1

METHODS AND APPARATUS TO REDUCE SWITCHING LOSSES IN POWER CONVERTERS

FIELD OF THE DISCLOSURE

This disclosure relates generally to power converters, and, more particularly, to methods and apparatus to reduce switching losses in power converters.

BACKGROUND

A power converter is a circuit used in various electrical systems to convert an input voltage to a desired output voltage. For example, a boost converter converts an input voltage into a higher output voltage by controlling transistors and/or switches to charge and/or discharge inductors and/or capacitors to maintain the desired output voltage.

BRIEF DESCRIPTION OF THE DRAWINGS

FIG. 1 is a schematic illustration of a boost converter system.

FIGS. 2A-2C are plots of the voltage across the switching device of FIG. 1 versus time and the current conducting though the inductor of FIG. 1 versus time, at various input voltage levels.

FIGS. 6A-6B are plots of various voltage and current signals of the switching device of FIG. 3, shown on a more focused timescale than the plot in FIG. 5.

FIGS. 8A-8B are plots of various voltage and current signals of the switching device of FIG. 3, shown on a more focused timescale than the plot in FIG. 7.

FIG. 9 is a plot of current conducting through the inductor of FIG. 3 versus time and a frequency domain representation of the current conducting through the inductor of FIG. 3.

Figure 2B:
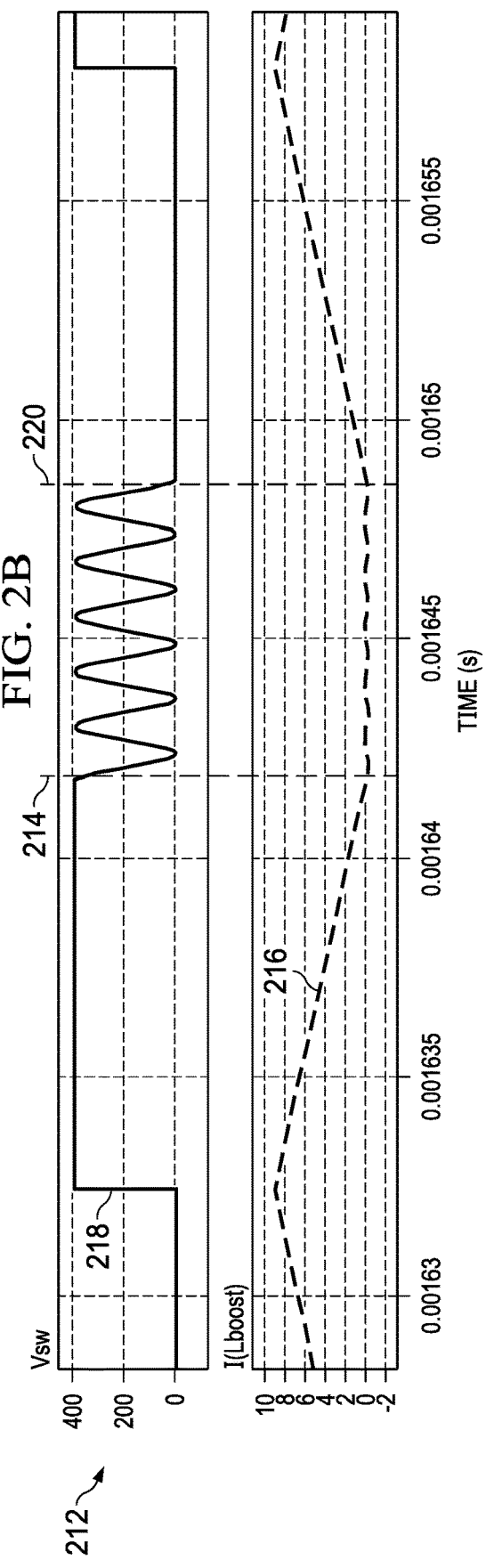

The figures are not to scale. In general, the same reference numbers will be used throughout the drawing(s) and accompanying written description to refer to the same or like parts Descriptors "first," "second," "third," etc. are used herein when identifying multiple elements or components that may be referred to separately. Unless otherwise specified or understood based on their context of use, such descriptors are not intended to impute any meaning of priority, physical order or arrangement in a list, or ordering in time but are merely used as labels for referring to multiple elements or components separately for ease of understanding the disclosed examples. In some examples, the descriptor "first" may be used to refer to an element in the detailed description, while the same element may be referred to in a claim with a different descriptor such as "second" or "third." In such instances, it should be understood that such descriptors are used merely for ease of referencing multiple elements or components. Connection references (e.g., attached, coupled, connected, and joined) are to be construed broadly and may include intermediate members between a collection of elements and relative movement between elements unless otherwise indicated. As such, connection references do not necessarily infer that two elements are directly connected and in fixed relation to each other.

DETAILED DESCRIPTION

A boost converter system is a circuit including an inductor, a capacitor, a switching device (e.g., metal oxide semiconductor field effect transistors (MOSFETs), etc.), and a diode configured to generate a desired output voltage from an input voltage. A controller of the boost converter system enables or disables conduction of a switching device in order to regulate the output voltage of the boost converter system. The boost converter system generates a desired output voltage from the input voltage based on the controller enabling or disabling conduction of the switching device. For example, the controller of a boost converter system may enable the switching device (e.g., a MOSFET), thereby current to conduct from the power source, through the inductor to ground. As such, enabling the switching device will cause current to flow through the inductor, thereby storing energy in a magnetic field of the inductor coil. Once the inductor is sufficiently charged, the controller disables conduction of the switching device and the current from the inductor flows to the capacitor and the load, while the capacitor maintains the desired output voltage of the boost converter and the load receives power. The switching pattern noted above allows for current to flow into the load of a boost converter system. The controller toggles the switching control to ensure that boost converter converts the input voltage to a higher, desired output voltage.

FIG. 1 is a schematic illustration of a boost converter system 100. The boost converter system 100 includes an inductor 102, a capacitor 104, a switching device 106, a diode 108, a load 110, a switch capacitance 112, a voltage source 114, and a controller 116. As described above, the controller 116 enables and disables the switching device 106 to control current conducting though the boost converter system 100. In FIG. 1, switching loss of the boost converter system 100 may be based on the voltage across the switching device 106 when the switching device 106 is enabled.

The boost converter system 100 is operable in various modes: discontinuous conduction mode (DCM), continuous conduction mode (CCM), and/or transition mode (TM). If the boost converter system 100 operates in DCM, the controller 116 generates and/or otherwise provides the enable signal (line 101) to the switching device 106 when the current conducting though the inductor 102 is zero amperes for a finite period of time (e.g., zero amperes for 0.2 seconds, 0.6 seconds, or any suitable threshold of time).

If the boost converter system 100 operates in CCM, the controller 116 generates and/or otherwise provides the enable signal (line 101) to the switching device 106 when the current conducting though the inductor 102 is slightly greater than, or at, a lower current limit. For example, if the lower current limit is 1 ampere, the controller 116 provides and/or otherwise generates the enable signal (line 101) when the current conducting though the inductor discharges to, or is slightly above (e.g., microamperes above, etc,), 1 ampere.

If the boost converter system 100 operates in TM, the controller 116 generates and/or otherwise provides the enable signal (line 101) to the switching device 106 the moment the controller 116 determines that the current conducting though the inductor 102 is zero amperes. In TM operation, the controller 116 may generate and/or otherwise provide the enable signal (line 101) after a negligible delay (e.g., one microsecond) in response to determining that the currenting conducting though the inductor 102 is zero amperes. Likewise, for applications including the controller operating in TM, the controller 116 may generate and/or otherwise provide the enable signal (line 101) to the switching device 106 in response to determining that the voltage across the inductor 102 and/or switching device 106 is zero volts. In such applications, the controller 116 may be referred to as operating as a full zero-voltage switching (ZVS) controller.

A first characteristic of the boost converter system 100 when the controller 116 operates as a full ZVS controller is that the voltage across the switch capacitance 112 rings to zero volts if the input voltage is lower than half the output voltage. As such, the lower peak amplitude (e.g., trough or valley) of the voltage across the switching device 106 also rings to zero volts (e.g., because the voltage across the switch capacitance 112 is proportional to the voltage across the switching device 106). When the controller 116, operating as a full ZVS controller, monitors zero volts across the switching device 106, the controller 116 generates the enable signal (line 101) and, therefore, the switching device 106 may be enabled with a zero-voltage potential across the switching device 106.

Alternatively, the controller 116 does not operate as a full ZVS controller if the input voltage is greater than half the output voltage. As such, the lower peak amplitude (e.g., trough or valley) of the voltage across the switching device 106 rings to a non-zero voltage (e.g., because the voltage across the switch capacitance 112 is equal to the voltage across the switching device 106). When the controller 116 monitors that the lower peak amplitude of the voltage across the switching device 106 rings to a non-zero voltage, the controller 116 no longer operates as a full ZVS controller. As such, the controller 116 generates the enable signal (line 101) for the switching device 106 with a non-zero voltage potential across the switching device 106.

Figure 2C:
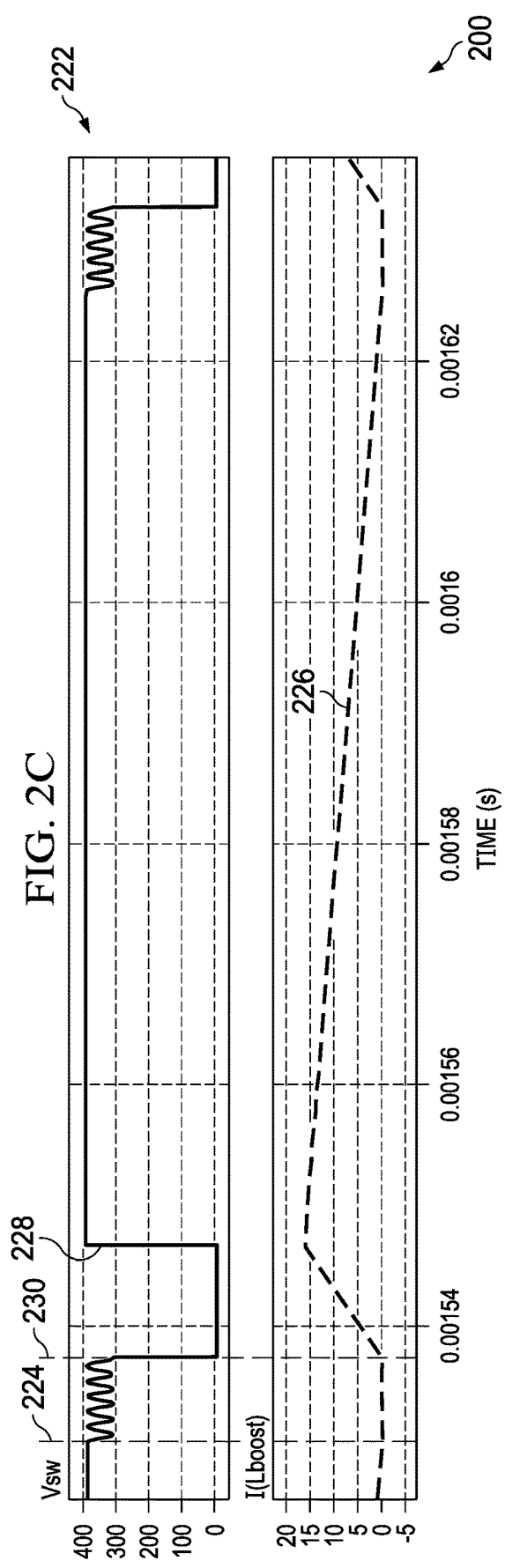

FIGS. 2A-2B represents voltage and current signals in the boost converter system 100 during the first characteristic scenario (e.g., when the magnitude of the input voltage is lower than half the magnitude of the output voltage). FIG. 2C represents voltage and current signals in the boost converter system 100 when the magnitude of the input voltage is greater than half the magnitude of the output voltage.

FIGS. 2A-2C are plots 202, 212, 222 of the voltage across the switching device 106 of FIG. 1 versus time and the current conducting though the inductor 102 of FIG. 1 versus time, at various input voltage levels. In the plot 202 of FIG. 2A, the input voltage of the boost converter system 100 is 75 volts and the output voltage of the boost converter system 100 is 390 volts. At a first time interval 204, the inductor current signal (line 206) reaches 0 amperes and, because the input voltage is less than half the output voltage (e.g., 75 volts is less than 195 volts), the switching device voltage signal (line 208) rings to a lower peak amplitude of zero volts. As such, at a second time interval 210, the voltage across the switching device 106 (e.g., the magnitude of the switching device voltage signal (line 208)) reaches zero volts. In FIG. 2A, the controller 116 operates as a full ZVS controller.

In the plot 212 of FIG. 2B, the input voltage of the boost converter system 100 is 190 volts and the output voltage of the boost converter system 100 is 390 volts. At a third time interval 214, the inductor current signal (line 216) reaches 0 amperes and, because the input voltage is less than half the output voltage (e.g., 190 volts is less than 195 volts), the switching device voltage signal (line 218) rings to a lower peak amplitude of zero volts. As such, at a fourth time interval 220, the voltage across the switching device 106 (e.g., the magnitude of the switching device voltage signal (line 218)) rings to a lower peak amplitude of zero volts. In FIG. 2B, the controller 116 operates as a full ZVS controller.

In the plot 222 of FIG. 2C, the input voltage of the boost converter system 100 is 350 volts and the output voltage of the boost converter system 100 is 390 volts. At a fifth time interval 224, the inductor current signal (line 226) reaches 0 amperes and, because the input voltage is greater than half the output voltage (e.g., 350 volts is greater than 195 volts), the switching device voltage signal (line 228) does not ring to a lower peak amplitude of zero volts. As such, at a sixth time interval 230, the voltage across the switching device 106 (e.g., the magnitude of the switching device voltage signal (line 228)) does not ring to a lower peak amplitude of zero volts. Because the voltage across the switching device 106 (e.g., the magnitude of the switching device voltage signal (line 228)) does not ring to a lower peak amplitude of zero volts, switching losses are increased and the power density of the boost converter system 100 is reduced.

As such, the boost converter system 100 may operate inefficiently (e.g., experiences low-power density and high switching loss) when the input voltage is greater than half of the output voltage. During conditions in which the voltage across the switching device 106 does not ring to a lower peak amplitude of zero volts (e.g., because the input voltage is greater than half the output voltage), the controller 116 operates based on the quasi-resonant operation of the boost converter system 100 to generate and/or otherwise provide the enable signal (line 101) at the valley (e.g., lower limit) of the voltage across the switching device 106. During such conditions, the voltage across the switch capacitance 112 does not ring to a lower peak amplitude of zero volts and therefore, the voltage across the switching device 106 will not reach zero volts. Because the voltage across the switching device 106 does not ring to a lower peak amplitude of zero volts, the switching device 106 is enabled when there is a large (e.g., greater than zero) voltage across the switching device 106. As a result, for a period of time (e.g., 5 milliseconds) the switching device 106 experiences a large voltage drop (e.g., greater than zero volts) between the respective drain and source terminals of the switching device 106. The large voltage drop (e.g., greater than zero volts) across the switching device 106 thereby causes switching losses (e.g., power losses dissipated in the form of heat) occurring in the boost converter system 100. As a result, the boost converter system 100 experiences inefficient operation in the form of a reduction in power density, undesirable switching frequencies, etc.

Examples disclosed herein reduce switching losses in a boost converter system. Examples disclosed herein may be utilized in boost converter systems when the input voltage to the boost converter system is greater than half the output voltage of the boost converter system. Additionally or alternatively, examples disclosed herein may reduce residual switching losses in any suitable converter such as a buck converter, buck-boost converter, etc.

Examples disclosed herein determine the relationship between the input voltage signal and the output voltage signal. In examples disclosed herein, if the input voltage is greater than half the output voltage, the disclosed methods, apparatus, and/or articles of manufacture may provide a current to conduct though the inductor to the input voltage source of a boost converter system. Examples disclosed herein utilize a switch (e.g., a MOSFET) to conduct, though respective current terminals (e.g., from a drain terminal to a source terminal in a MOSFET), a current through the inductor. Such a current may conduct through the inductor for a period of time determined by the controller. In examples disclosed herein, the current conducting through the inductor of the boost converter system allows the corresponding voltage across a respective switch capacitance, and across a respective switching device, to decrease, or substantially decrease to, zero volts (e.g., decrease to zero volts, decrease to 1 millivolt, decrease to 2 volts). In another example disclosed herein, the switch may be enabled (e.g., a turn on signal sent to the switch) when there is a zero-voltage drop across the respective current terminal (e.g., a zero-voltage drop from the drain terminal to the source terminal in a MOSFET).

Examples disclosed herein allow for the voltage across the corresponding switch capacitance in a boost converter system to discharge to zero volts. In such examples disclosed herein, full soft switching (e.g., zero voltage switching) of the switching device is enabled during all operating conditions of a boost converter system. Moreover, examples disclosed herein enable an increase in the switching frequency (e.g., increase to 1-megahertz for a power converter utilizing a super-junction (S-J) silicon transistor) of the boost converter system as a result of the reduced switching losses. As such, in examples disclosed herein, the increase in switching frequency enables an increase in power density. Examples disclosed herein enable zero voltage switching under all operating conditions in a boost converter, or any suitable power converter (e.g., buck converter, buck-boost converter, etc.).

In examples disclosed herein, a power converter utilizing S-J silicon transistors is operable utilizing a switching frequency around 1-megahertz. Additionally, a power converter utilizing gallium nitride switching device is operable utilizing a switching frequency in the 2-megahertz to 3-megahertz range. In such examples disclosed herein, the increase in switching frequency (e.g., 1-megahertz, 2-megahertz to 3-megahertz, etc.) is high enough above 150 kilohertz to have a significant effect on the size and cost the power converter system (e.g., component sizes of a corresponding electromagnetic interference filter (EMI) is reduced as compared to power converter systems not utilizing exampled disclosed herein).

Figure 3:
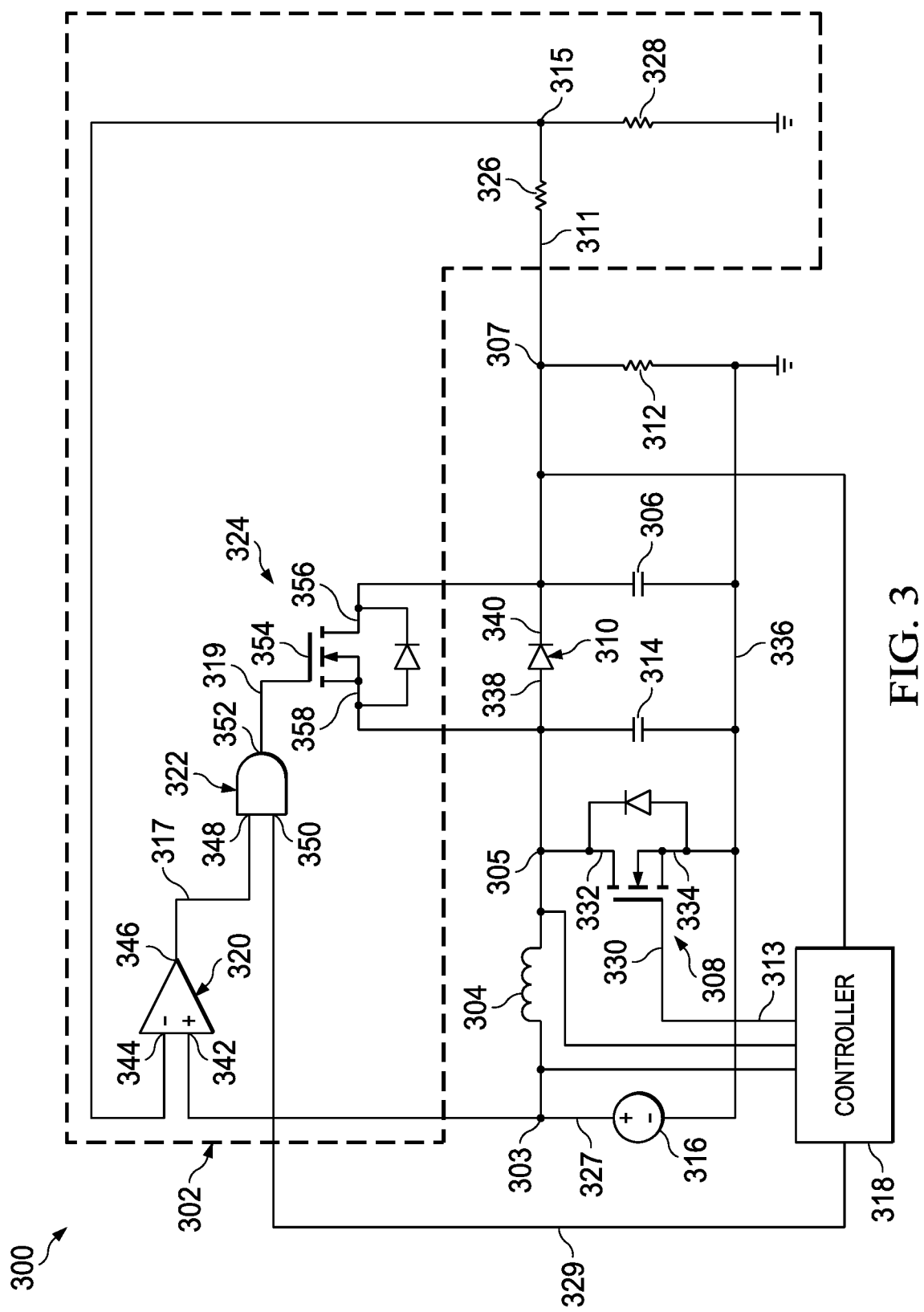
FIG. 3 is a schematic illustration of an example boost converter system coupled to an example compensation network to reduce switching loss in the boost converter system.

FIG. 3 is a schematic illustration of an example boost converter system 300 including an example compensation network 302 to reduce switching loss in the boost converter system 300. The boost converter system 300 includes the compensation network 302, an example inductor 304, an example capacitor 306, an example switching device 308, an example diode 310, an example load 312, an example switch capacitance 314, an example voltage source 316, and an example controller 318. Moreover, the compensation network 302 includes an example comparator 320, an example logic gate 322, an example ZVS switch 324, an example first resistor 326, and an example second resistor 328.

Illustrated in the example of FIG. 3, the compensation network 302 is coupled to an example input voltage node 303 (e.g., input node), an example switch voltage node 305, and an example output voltage node 307 (e.g., output node). In FIG. 3, the compensation network 302 is coupled to the input voltage node 303 to obtain an example input voltage signal (line 327). Additionally, the compensation network 302 is coupled to the output voltage node 307 to obtain an example output voltage signal (line 311). The compensation network 302 may be implemented using hardware logic, machine readable instructions, hardware implemented state machines, etc., and/or a combination thereof. The operation of the compensation network 302 is explained in further detail below, in connection with the components included in the compensation network 302.

In FIG. 3, the inductor 304 is coupled to the input voltage node 303 and to the switch voltage node 305. The capacitor 306 is coupled to the output voltage node 307 and to an example reference rail 336. The boost converter system 300 may include components (e.g., capacitors, inductors, inductive elements, capacitive elements, etc.) that, when driven by the controller 318 convert the voltage at the input voltage node 303 to a desired output voltage at the output voltage node 307.

In the example of FIG. 3, the switching device 308 is an n-channel metal-oxide-semiconductor field-effect transistor (NMOS). The switching device 308 includes an example gate terminal 330, and example drain terminal 332, and an example source terminal 334. In FIG. 3, gate terminal 330 of the switching device 308 is coupled to the controller 318, the drain terminal 332 of switching device 308 is coupled to the switch voltage node 305, and the source terminal 334 of the switching device 308 is coupled to the reference rail 336. In other examples disclosed herein, the switching device 308 may be any suitable switching device (e.g., p-channel metal-oxide-semiconductor field-effect transistor (PMOS), a high electron mobility transistor (HEMT), bi-polar junction transistor (BJT), a diode, a transistor produced using silicon substrate, a gallium nitride transistor and/or switching device, etc.).

In the example of FIG. 3, the diode 310 includes an example anode terminal 338, and example cathode terminal 340. In FIG. 3, the anode terminal 338 of the diode 310 is coupled to the switch voltage node 305 and the cathode terminal 340 of the diode 310 is coupled to the output voltage node 307. In other examples disclosed herein, the diode 310 may be any suitable device (e.g., PMOS, NMOS, a high electron mobility transistor (HEMT), bi-polar junction transistor (BJT), a transistor produced using silicon substrate, a gallium nitride transistor and/or switching device, etc.) utilized as a rectifying device for the boost converter system 300.

In FIG. 3, the load 312 is a resistive load coupled to the output voltage node 307 and the example reference rail 336. In the example of FIG. 3, the load 312 is coupled to the output voltage node 307 to obtain and/or otherwise consume the voltage and/or current provided via the boost converter system 300. In other examples disclosed herein, the load 312 may be any other suitable load (e.g., capacitive load, inductive load, capacitive-inductive load, etc.,) utilized in any suitable electrical system. For example, the load 312 may be traction inverter in an electric vehicle (EV), a hybrid electric vehicle (HEV), or a load in any suitable power electronic application.

In the example illustration of FIG. 3, the switch capacitance 314 represents the inherent drain-to-source capacitance of the switching device 308 and/or any stray capacitance of devices coupled to the switching device 308. When the switching device 308 is disabled (e.g., not conducting) and the diode 310 conducts, the voltage across the switch capacitance 314 is equivalent to the voltage across the capacitor 306 (e.g., the output voltage) plus the voltage drop from the anode terminal 338 to the cathode terminal 340 of the diode 310.

In FIG. 3, the voltage source 316 provides a direct current (DC) voltage to the boost converter system 300. In other examples disclosed herein, the voltage source 316 may provide a rectified alternating current (AC) voltage to the boost converter system 300. The voltage source 316 may be implemented using any suitable voltage source (e.g., battery, output of a transformer, etc.).

In the example of FIG. 3, the controller 318 controls the enable signal (line 313) for the switching device 308. As described above, the controller 318 enables and disables the switching device 308 to control current conducting though the boost converter system 300. In examples disclosed herein, the controller 318 operates as a full ZVS controller. For example, the controller 318 generates and/or otherwise provides the enable signal (line 313) to the switching device 308 in response to monitoring that the voltage across the switching device 308 is zero volts (e.g., zero voltage switching). The controller 318 may sense and/or otherwise measure the voltage across the switching device 308 using any suitable voltage sensing device and/or method.

In addition, the controller 318 is coupled to the compensation network 302 to provide an example peak threshold signal (line 329). The controller 318 provides the peak threshold signal (line 329) for a length of time determined based on, at least, the input voltage, the output voltage, and the inductance of the inductor 304. In examples disclosed herein, the controller 318 generates the peak threshold signal (line 329) when the voltage at the switch voltage node 305 rings to a peak (e.g., rising edge). The controller 318 may be implemented using hardware logic, machine readable instructions, hardware implemented state machines, etc., and/or a combination thereof.

In the example illustrated in FIG. 3, the comparator 320 includes an example first input terminal 342, an example second input terminal 344, and an output terminal 346. In FIG. 3, the first input terminal 342 is coupled to the input voltage node 303 and the second input terminal 344 is coupled to an example divided output voltage node 315. The comparator 320 compares the voltage at the input voltage node 303 with the voltage at the divided output voltage node 315. In the example of FIG. 3, the first resistor 326 and the second resistor 328 are equivalent, or substantially similar, resistors. In the topology illustrated in FIG. 3, the first resistor 326 and the second resistor 328 act as a voltage divider, ensuring half of the output voltage signal (line 311) is at the divided output voltage node 315. Therefore, the comparator 320 effectively compares the input voltage signal (line 327) with half of the output voltage signal (line 311). In operation, the comparator 320 generates an example indication signal (line 317) in response to determining the voltage of the input voltage signal (line 327) is greater than the voltage at the divided output voltage node 315. Therefore, the operation of the compensation network 302 may be enabled when the comparator 320 determines the voltage of the input voltage signal (line 327) is greater than half of the voltage of the output voltage signal (line 311).

In FIG. 3, the logic gate 322 includes a first example input terminal 348, a second example input terminal 350, and an example output terminal 352. In FIG. 3, the first input terminal 348 of the logic gate 322 is coupled to the output terminal 346 of the comparator 320, the second input terminal 350 of the logic gate 322 is coupled to the controller 318, and the output terminal 352 of the logic gate 322 is coupled to an example gate terminal 354 of the ZVS switch 324. In the topology illustrated in FIG. 3, the logic gate 322 is a logic-AND gate. Additionally or alternatively, the logic gate 322 may be any suitable logic gate utilized to obtain the indication signal (line 317) and generate an example trigger signal (line 319). In operation, the logic gate 322 provides trigger signal (line 319) in response to determining the indication signal (line 317) is a logic-high signal and the peak threshold signal (line 329) is a logic-high signal. In examples disclosed herein, the peak threshold signal (line 329) is generated by the controller 318, in response to the controller 318 monitoring the voltage at the switch voltage node 305 is at a peak (e.g., the ringing peak of the switch capacitance 314).

In the example illustrated in FIG. 3, the ZVS switch 324 includes the gate terminal 354, and example drain terminal 356, and an example source terminal 358. In examples disclosed herein, the drain terminal 356 and/or the source terminal 358 may be referred to as current terminals. In the topology of FIG. 3, the gate terminal 354 is coupled to the output terminal 352 of the logic gate 322, the drain terminal 356 is coupled to the output voltage node 307, and the source terminal 358 is coupled to the switch voltage node 305. The ZVS switch 324 is an NMOS device that is physically smaller than the switching device 308. For example, the ZVS switch 324 is configured to conduct a small amount of current (e.g., 1 milliampere, etc.) as compared to the switching device 308 that conducts a large amount of current (e.g., 1 ampere, 5 amperes, etc.). The ZVS switch 324 is coupled in parallel with the diode 310 to conduct a negative current (e.g., negative 1 milliampere) with respect to the polarity of the current conducting through the inductor 304. In operation, when the ZVS switch 324 is enabled, a small current (e.g., 1 milliampere) will conduct from the drain terminal 356 to the source terminal 358. As such, the current conducting though the ZVS switch 324 conducts through the inductor 304 and allows for the discharge of voltage across the switch capacitance 314.

In addition, by generating the peak threshold signal (line 329) when the voltage at the switch voltage node 305 (e.g., the voltage at the source terminal 358) is at a peak (e.g., the ringing peak of the switch capacitance 314), the topology of FIG. 3 ensures the ZVS switch 324 may be enabled when there is a minimal voltage drop (e.g., 0 volts) from the drain terminal 356 to the source terminal 358. For example, the peak threshold signal (line 329) is generated when the voltage at the switch voltage node 305 (e.g., the voltage at the source terminal 358) is at a peak (e.g., the ringing peak of the switch capacitance 314). Because the voltage across the switch capacitance 314 may ring to a peak voltage substantially similar to the output voltage (e.g., the voltage at the output voltage node 307 plus the voltage drop across the diode 310), the ZVS switch 324 is enabled when there is a minimal voltage drop (e.g., 0 volts, 0.1 volts, etc.) from the drain terminal 356 to the source terminal 358.

In the example of FIG. 3, the controller 318 generates the peak threshold signal (line 329) for a threshold duration. In such examples disclosed herein, the threshold duration may be calculated by the controller 318. The threshold duration may correspond to the length of time in which to enable the ZVS switch 324. Additionally or alternatively, any suitable method of determining the threshold duration (e.g., conduction time and/or current conduction amount) with respect to the ZVS switch 324 may be used.

In an example operation of the boost converter system 300, when the switching device 308 is enabled (e.g., turned on or conducting), the input voltage is applied across the inductor 304, thereby causing the inductor current to increase. After the current through the inductor 304 increases to a desired value, the switching device 308 is disabled (e.g., turned off or not conducting). As a result, the inductor current discharges through the diode 310 and into the load 312. The current through the inductor 304 discharges until reaching zero amperes.

Further in such example operation, after the current in the inductor 304 discharges to zero amperes and the diode 310 no longer conducts, the switch capacitance 314 will resonate with the inductor 304 and the voltage across the switch capacitance 314 will ring down. If the input voltage of the input voltage source 316 is lower than half the output voltage (e.g., the voltage at the output voltage node 307), then the voltage at the switch voltage node 305 rings down to zero volts, or even below zero volts, thereby enabling the turn on of the switching device 308 with zero volts across it. In such a scenario, switching losses of the switching device 308 are eliminated or substantially reduced.

If the input voltage of the input voltage source 316 is greater than half the output voltage (e.g., the voltage at the output voltage node 307), then the voltage at the switch voltage node 305 (e.g., the voltage at the source terminal 358 of the ZVS switch 324) will not ring to a valley peak of zero volts. In such a scenario, the ZVS switch 324 is turned on to allow current to flow through the inductor 304 and into the input voltage source 316. Since the ZVS switch 324 is on, the inductor current will go to zero amperes and will build up in the negative direction. The negative current builds up in the inductor 304 long enough to create sufficient negative current in the inductor 304 to completely, or substantially, discharge the voltage at the switch voltage node 305 (e.g., the voltage at the source terminal 358 of the ZVS switch 324) when the ZVS switch 324 is turned off. The ZVS switch 324 is enabled if the voltage of the input voltage source is greater than half voltage at the output voltage node 307.

Furthermore, switching losses of the ZVS switch 324 can be minimized by enabling (e.g., turning on) the ZVS switch 324 with a minimal drain-to-source voltage ($V_{DS}$). This can be achieved by turning it on at the peak of the resonant ring. For example, an optimal time to enable the ZVS switch 324 is when the voltage at the source terminal 358 of the ZVS switch 324 rings to a peak. Because the ringing peak of the voltage at the source terminal 358 is equivalent to the output voltage plus the voltage drop across the diode 310, the ZVS switch 324 is enabled with zero, or minimal, drain-to-source voltage VDS.

Figure 4:
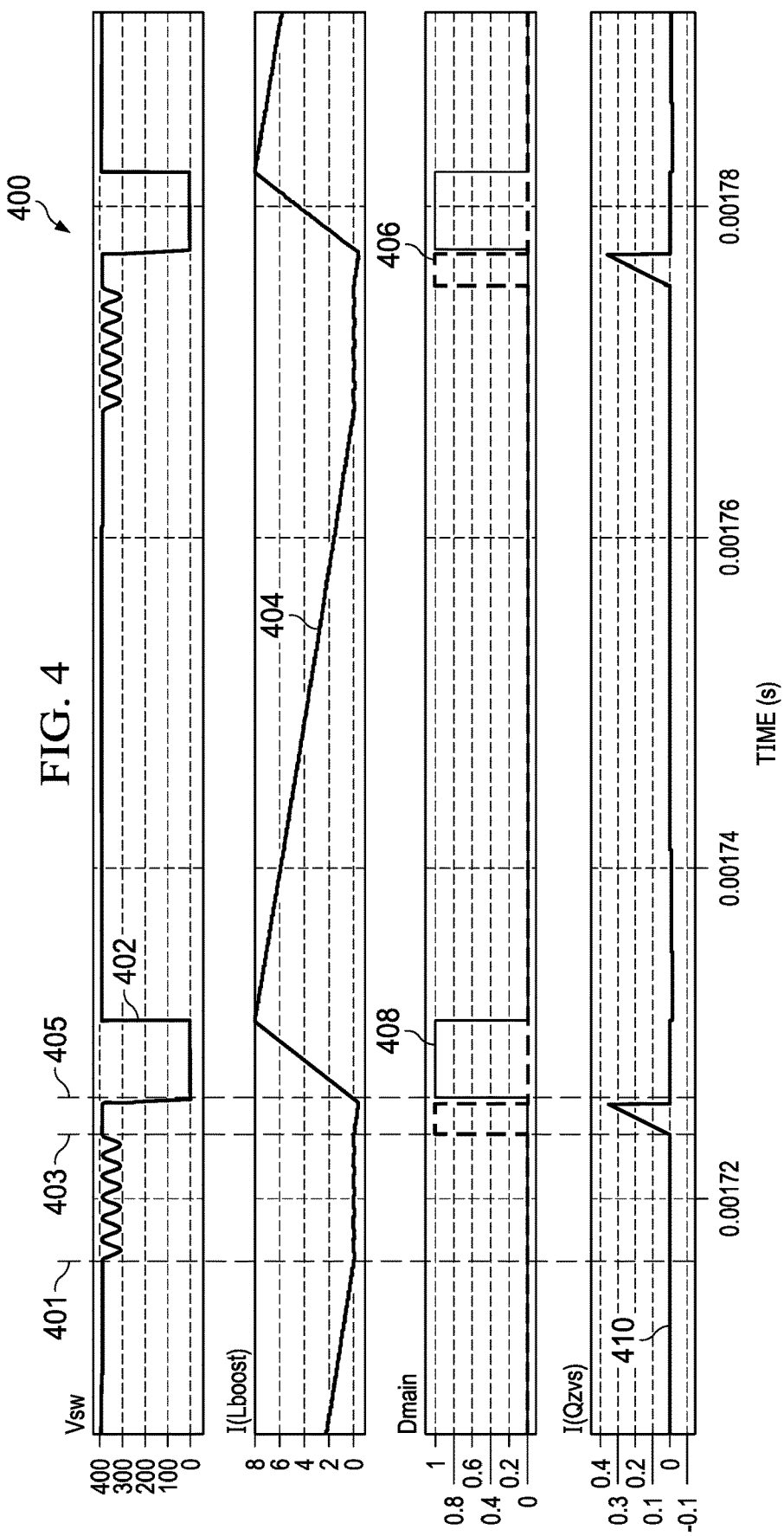
FIG. 4 is a plot of various voltage, current, and enable signals versus time in the boost converter system of FIG. 3.

FIG. 4 is a plot 400 of various voltage, current, and enable signals versus time in the boost converter system 300 of FIG. 3. FIG. 4 illustrates an example switch node voltage signal (line 402), an example inductor current signal (line 404), an example enable transistor trigger signal (line 406), and an example switching device enable signal (line 408), and an example enable switch current (line 410). The voltage, current, and enable signals of FIG. 4 represent respective similar voltage, current, and enable signals occurring during operation of FIG. 3. For example, the switch node voltage signal (line 402) may represent the switch node voltage signal of the switch voltage node 305 of FIG. 3, the inductor current signal (line 404) may represent the current conducting through the inductor 304 of FIG. 3, the enable transistor trigger signal (line 406) may represent the trigger signal (line 319) of FIG. 3, the switching device enable signal (line 408) may represent the enable signal (line 313) of FIG. 3, and the enable switch current (line 410) may represent the current conducting through the ZVS switch 324 of FIG. 3. Additionally, the operating conditions portrayed in FIG. 4 represent when the magnitude of the input voltage signal (e.g., the input voltage signal from the voltage source 316) is 365 volts and the magnitude of the output voltage signal (e.g., the output voltage signal (line 311)) is 390 volts.

Illustrated in FIG. 4, at a first example time interval 401, the inductor current signal (line 404) reaches zero amperes. As such, the switch node voltage signal (line 402) rings to a trough that does not reach zero volts. At a second example time interval 403, the enable transistor trigger signal (line 406) becomes a logic high, thereby causing the conduction of a small current (e.g., 0.37 amperes) through the inductor (line 404) and into the input voltage. As a result, the switch node voltage signal (line 402) decreases to zero volts. At a third example time interval 405, the switch node voltage signal (line 402) decreases to zero volts and, therefore, the switching device enable signal (line 408) becomes a logic high. Indicated by the plot 400 in FIG. 4, full ZVS control (e.g., enabling the switching device when the switch node voltage signal (line 402) is zero volts) is achievable.

Figure 5:
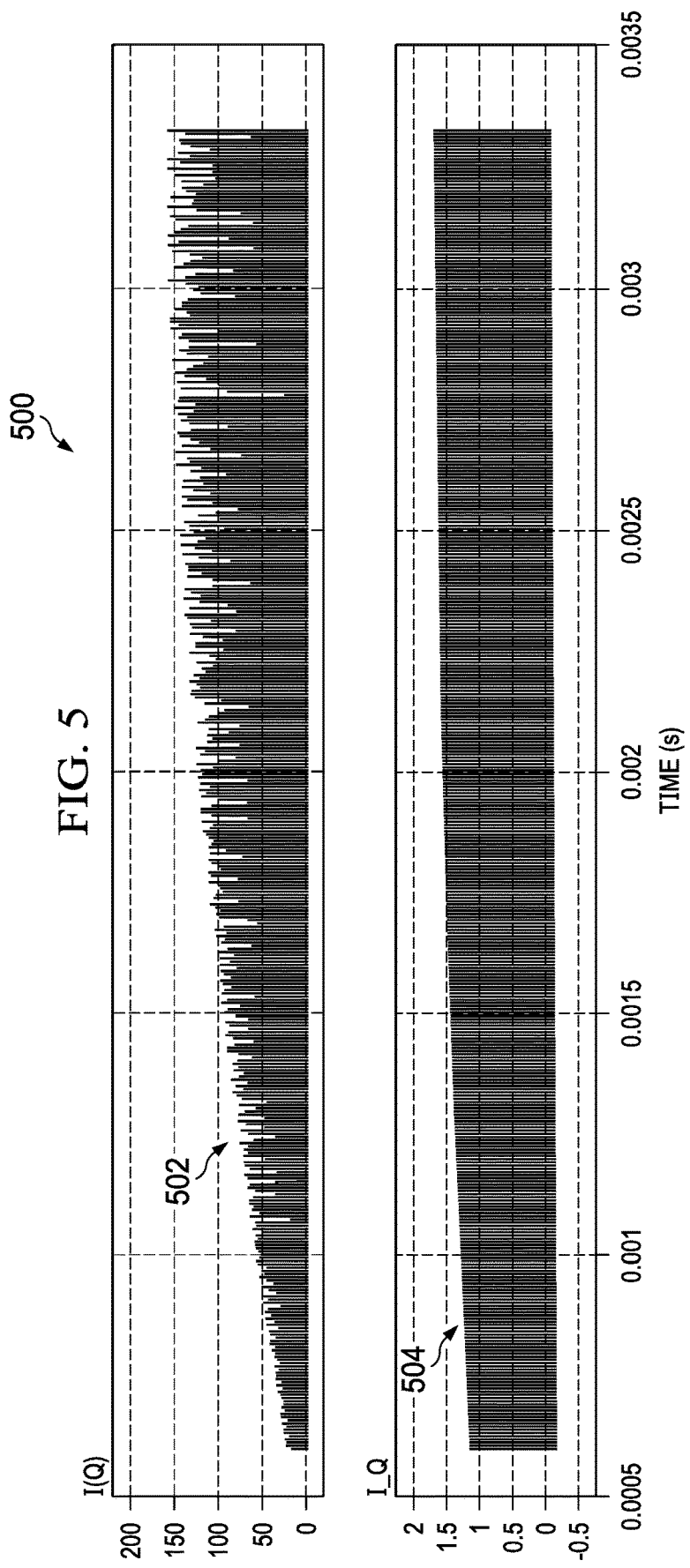
FIG. 5 is a plot of the current conducting through the switching device of FIG. 3 versus time during quasi-resonant operation.

FIG. 5 is a plot 500 of the current conducting through the switching device 308 of FIG. 3 versus time during quasi-resonant operation. In FIG. 5, an example first quasi-resonant (QR) switching device current signal (line 502) represents the current conducting through the switching device 308 of the boost converter system 300 if the compensation network 302 is not utilized. Illustrated in FIG. 5, the first QR switching device current signal (line 502) reaches a magnitude of 150 amperes. On the other hand, an example second QR switching device current signal (line 504) represents the current conducting through the switching device 308 of the boost converter system 300 if the compensation network 302 is utilized. As such, the second QR switching device current signal (line 504) reaches a magnitude of about 1.5 amperes. As illustrated in FIG. 5, the switching losses experienced in the boost converter system 300 if the compensation network 302 is utilized during quasi-resonant switching operation is reduced (e.g., the second QR switching device current signal (line 504) reaches 1.5 amperes and the first QR switching device current signal (line 502) reaches 150 amperes).

FIGS. 6A-6B are plots 610, 620 of various voltage and current signals of the switching device 308 of FIG. 3, shown on a more focused timescale than plot 500 in FIG. 5. More specifically, the illustration of FIGS. 6A-6B include a more refined time scale on the x-axis as in FIG. 5. In FIG. 6A, an example first quasi-resonant (QR) switching device current signal (line 602) represents the current conducting through the switching device 308 of the boost converter system 300 if the compensation network 302 is not utilized. Additionally, an example voltage signal (line 604) represents the voltage across the switching device 308 (e.g., the voltage across the switch capacitance 314) if the compensation network 302 is not utilized. Between an example first time interval 601 and an example second time interval 603, the voltage signal (line 604) decreases to a non-zero voltage (e.g., 250 volts). At the second time interval 603, the controller 318 generates the enable signal (line 313) for the switching device 308 and, for a brief period of time (e.g., 1 microsecond), there is a 250-volt potential across the switching device 308. As such, at the second time interval 603, the QR switching device current signal (line 602) illustrates a discharge (e.g., spikes to and/or conducts) of 15 amperes of current (e.g., a discharge of 15 amperes of current from the switch capacitance 314).

In FIG. 6B, an example second quasi-resonant (QR) switching device current signal (line 606) represents the current conducting through the switching device 308 of the boost converter system 300 if the compensation network 302 is utilized. At an example third time interval 605, the QR second switching device current signal (line 606) is less than zero amperes and, therefore, the voltage across the corresponding switching device 308 reaches a lower voltage than if the compensation network 302 is not utilized. As such, at a fourth time interval 607, the second QR switching device current signal (line 606) illustrates a discharge (e.g., spikes to and/or conducts) of 1.6 amperes of current (e.g., a discharge of 1.6 amperes of current from the switch capacitance 314).

Figure 7:
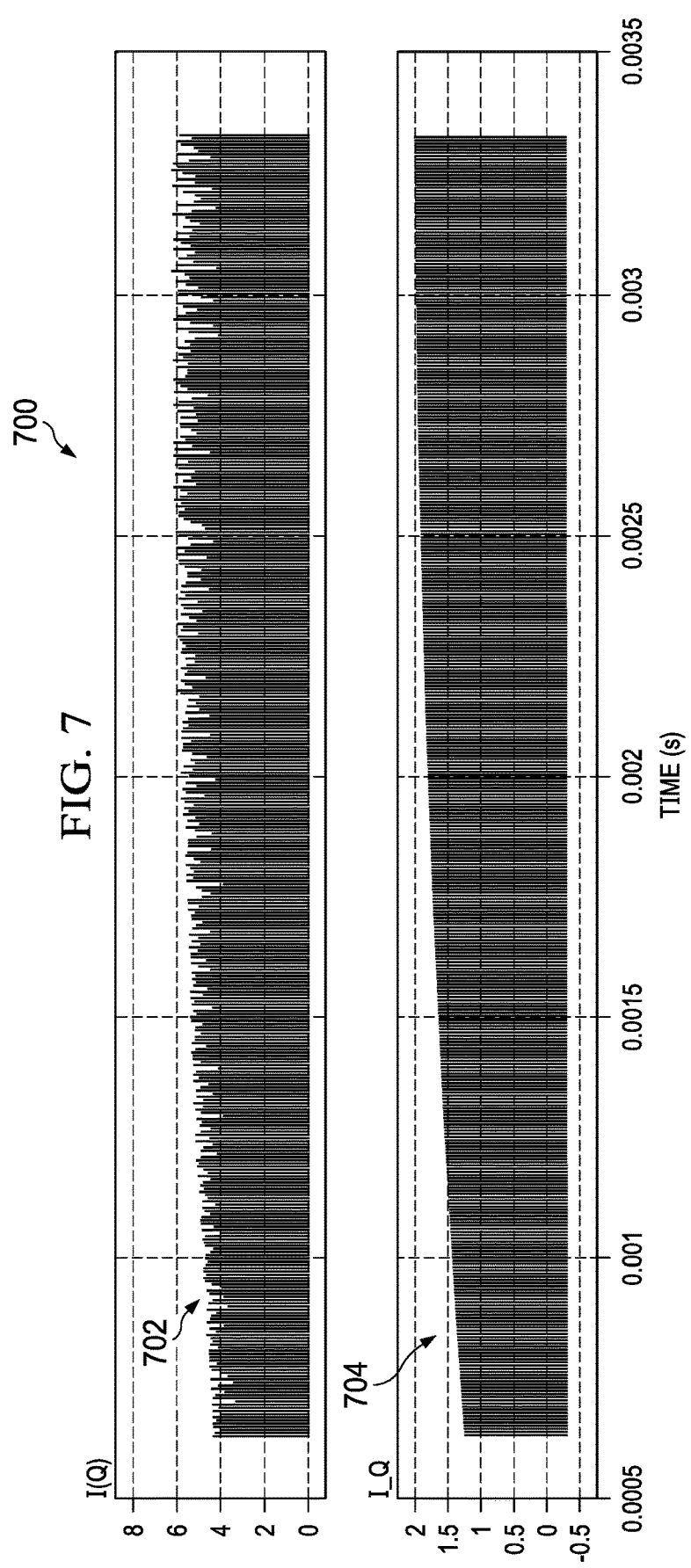
FIG. 7 is a plot of the current conducting through the switching device of FIG. 3 versus time for zero voltage switching operation.

FIG. 7 is a plot 700 of the current conducting through the switching device 308 of FIG. 3 versus time for zero voltage switching operation. In FIG. 7, an example first ZVS switching device current signal (line 702) represents the current conducting through the switching device 308 of the boost converter system 300 if the compensation network 302 is not utilized. Illustrated in FIG. 7, the first ZVS switching device current signal (line 702) reaches a magnitude of 6 amperes. On the other hand, an example second ZVS switching device current signal (line 704) represents the current conducting through the switching device 308 of the boost converter system 300 if the compensation network 302 is utilized. As such, the second ZVS switching device current signal (line 704) reaches a magnitude of about 2 amperes. As illustrated in FIG. 7, the switching losses experienced in the boost converter system 300 if the compensation network 302 is utilized during ZVS operation is likewise reduced (e.g., the second ZVS switching device current signal (line 704) reaches 2 amperes and the first ZVS switching device current signal (line 702) reaches 6 amperes).

FIGS. 8A-8B are plots 810, 820 of various voltage and current signals of the switching device 308 of FIG. 3, shown on a more focused timescale than the plot 700 in FIG. 7. More specifically, the illustration of FIGS. 8A-8B include a more refined time scale on the x-axis as in FIG. 7. In FIG. 8A, an example first ZVS switching device current signal (line 802) represents the current conducting through the switching device 308 of the boost converter system 300 if the compensation network 302 is not utilized. Additionally, an example voltage signal (line 804) represents the voltage across the switching device 308 (e.g., the voltage across the switch capacitance 314) if the compensation network 302 is not utilized. Between an example first time interval 801 and an example second time interval 803, the voltage signal (line 804) decreases to a non-zero voltage (e.g., 10 volts). At the second time interval 803, the controller 318 generates the enable signal (line 313) for the switching device 308 and, for a brief period of time (e.g., 1 microsecond), there is a 10-volt potential across the switching device 308. As such, at the second time interval 803, the ZVS switching device current signal (line 802) illustrates a discharge of 5 amperes of current (e.g., a discharge of 5 amperes of current from the switch capacitance 314).

In FIG. 8B, an example second ZVS switching device current signal (line 806) represents the current conducting through the switching device 308 of the boost converter system 300 if the compensation network 302 is utilized. At an example third time interval 805, the second ZVS switching device current signal (line 806) is less than zero amperes and, therefore, the voltage across the corresponding switching device 308 reaches a lower voltage than if the compensation network 302 is not utilized. As such, at a fourth time interval 807, the second ZVS switching device current signal (line 806) illustrates a discharge (e.g., spikes to and/or conducts) of 2 amperes of current (e.g., a discharge of 2 amperes of current from the switch capacitance 314).

FIG. 9 is a plot 900 of current conducting through the inductor (line 902) of FIG. 3 versus time and a frequency domain representation 904 of the current conducting through the inductor 304 of FIG. 3. In FIG. 9, between an example first time period 901 and an example second time period 903, the current conducting through the inductor 304 is zero amperes. As such, the frequency domain representation 904 indicates the harmonic content of the current conducting through the inductor 304 (line 902) when the power supplied by the boost converter system 300 decreases (e.g., decreases below 65 watts). A table illustrating the harmonic content and the International Electrotechnical Commission (IEC) standard versus harmonic order is shown below, in Table 1.

TABLE 1

| Harmonic Order | Harmonic Content (mA/W) | IEC Standard (mA/W) |
|---|---|---|
| 3 | 0.630227743 | 3.5 |
| 5 | 0.382608696 | 1.9 |
| 7 | 0.200828157 | 1 |
| 9 | 0.13747412 | 0.5 |
| 11 | 0.075196687 | 0.35 |
| 13 | 0.033457557 | 0.296 |

Figure 10:
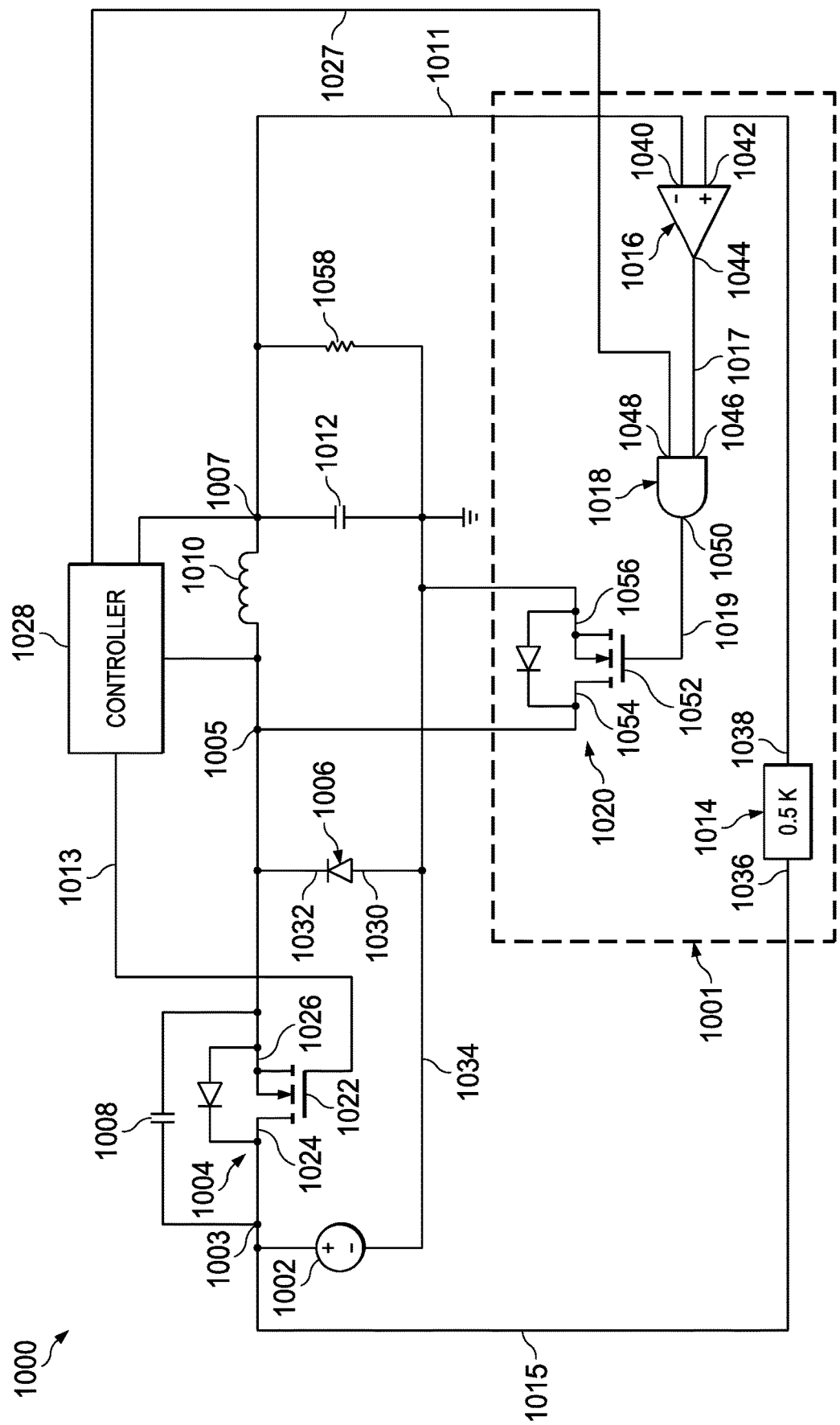
FIG. 10 is a schematic illustration of an example buck converter system coupled to an example compensation network to reduce switching loss in the buck converter system.

FIG. 10 is a schematic illustration of an example buck converter system 1000 including an example compensation network 1001 to reduce switching loss in the buck converter system 1000. The buck converter system 1000 includes an example input voltage source 1002, an example switching device 1004, an example diode 1006, an example switch capacitance 1008, an example inductor 1010, and an example capacitor 1012. The buck converter system 1000 also includes an example load 1058. Moreover, the compensation network 1001 includes an example reference determiner 1014, an example comparator 1016, an example logic gate 1018, and an example ZVS switch 1020.

Illustrated in the example of FIG. 10, the compensation network 1001 is coupled to an example input voltage node 1003 (e.g., input node), an example switch voltage node 1005, and an example output voltage node 1007 (e.g., output node). In FIG. 10, the compensation network 1001 is coupled to the input voltage node 1003 to obtain an example input voltage signal (line 1015). Additionally, the compensation network 1001 is coupled to the output voltage node 1007 to obtain an example output voltage signal (line 1011). The compensation network 1001 may be implemented using hardware logic, machine readable instructions, hardware implemented state machines, etc., and/or a combination thereof. The operation of the compensation network 1001 is explained in further detail below, in connection with the components included in the compensation network 1001.

In FIG. 10, the input voltage source 1002 provides a direct current (DC) voltage to the buck converter system 1000. In other examples disclosed herein, the input voltage source 1002 may provide a rectified AC voltage to the buck converter system 1000. The input voltage source 1002 may be implemented using any suitable voltage source (e.g., battery, output of a transformer, etc.).

In the example of FIG. 10, the switching device 1004 is an n-channel metal-oxide-semiconductor field-effect transistor (NMOS). The switching device 1004 includes an example gate terminal 1022, and example drain terminal 1024, and an example source terminal 1026. In FIG. 10, the gate terminal 1022 of the switching device 1004 is coupled to an example controller 1028, the drain terminal 1024 of the switching device 1004 is coupled to the input voltage node 1003, and the source terminal 1026 of the switching device 1004 is coupled to the switch voltage node 1005. In other examples disclosed herein, the switching device 1004 may be any suitable switching device (e.g., p-channel metal-oxide-semiconductor field-effect transistor (PMOS), a high electron mobility transistor (HEMT), bi-polar junction transistor (BJT), a diode, a transistor produced using silicon substrate, a gallium nitride transistor and/or switching device, etc.).

In the example of FIG. 10, the diode 1006 includes an example anode terminal 1030 and example cathode terminal 1032. In FIG. 10, the cathode terminal 1032 of the diode 1006 is coupled to the switch voltage node 1005 and the anode terminal 1030 of the diode 1006 is coupled to an example reference rail 1034. In other examples disclosed herein, the diode 1006 may be any suitable switching device (e.g., PMOS, NMOS, a high electron mobility transistor (HEMT), bi-polar junction transistor (BJT), a transistor produced using silicon substrate, a gallium nitride transistor and/or switching device, etc.) utilized as a rectifying device for the buck converter system 1000.

In the example illustration of FIG. 10, the switch capacitance 1008 represents the inherent drain-to-source capacitance of the switching device 1004 and/or any stray capacitance of devices coupled to the switching device 1004.

In FIG. 10, the inductor 1010 is coupled to the switch voltage node 1005 and to the output voltage node 1007. The capacitor 1012 is coupled to the output voltage node 1007 and to an example reference rail 1034. The buck converter system 1000 may include components (e.g., capacitors, inductors, inductive elements, capacitive elements, etc.) that, when driven by the controller 1028 convert the voltage at the input voltage node 1003 to a desired output voltage at the output voltage node 1007.

In the example of FIG. 10, the reference determiner 1014 includes an input terminal 1036 and an output terminal 1038. In FIG. 10, the input terminal 1036 of the reference determiner 1014 is coupled to the input voltage node 1003 and the output terminal 1038 of the reference determiner 1014 is coupled to the comparator 1016. The reference determiner 1014 provides a reference signal to the comparator 1016 in which the reference signal is equivalent to, or substantially similar to, half the input voltage signal (line 1015). The reference determiner 1014 may be implemented using any suitable analog, digital, hardware, software, and/or firmware apparatus to generate a signal equivalent to half of the input voltage signal (line 1015).

In the example illustrated in FIG. 10, the comparator 1016 includes an example first input terminal 1040, an example second input terminal 1042, and an example output terminal 1044. In FIG. 10, the first input terminal 1040 of the comparator 1016 is coupled to the output voltage node 1007 and the second input terminal 1042 of the comparator 1016 is coupled to the output terminal 1038 of the reference determiner 1014. The comparator 1016 compares the voltage at the output voltage node 1007 with the half the voltage of the input voltage signal (line 1015). Therefore, the comparator 1016 effectively compares half the of the input voltage signal (line 1015) with the output voltage signal (line 1011). In operation, the comparator 1016 generates an example indication signal (line 1017) in response to determining half the input voltage signal (line 1015) is less than the voltage at the output voltage node 1007. Therefore, the operation of the compensation network 1001 may be enabled when the comparator 1016 determines half the magnitude of the input voltage signal (line 1015) is less than the magnitude of the output voltage signal (line 1011).

In FIG. 10, the logic gate 1018 includes an example first input terminal 1046, an example second input terminal 1048, and an example output terminal 1050. In FIG. 10, the first input terminal 1046 of the logic gate 1018 is coupled to the output terminal 1044 of the comparator 1016, the second input terminal 1048 of the logic gate 1018 is coupled to the controller 1028, and the output terminal 1050 of the logic gate 1018 is coupled to the to the ZVS switch 1020. In the topology illustrated in FIG. 10, the logic gate 1018 is a logic-AND gate. Additionally or alternatively, the logic gate 1018 may be any suitable logic gate utilized to obtain the indication signal (line 1017) and generate an example trigger signal (line 1019). In operation, the logic gate 1018 provides trigger signal (line 1019) in response to determining the indication signal (line 1017) is a logic-high signal and an example peak threshold signal (line 1027) is a logic-high signal. In examples disclosed herein, the peak threshold signal (line 1027) is generated by the controller 1028, in response to the controller 1028 monitoring the magnitude of the voltage at the switch voltage node 1005 is at a trough (e.g., the ringing trough of the switch capacitance 1008).

In the example illustrated in FIG. 10, the ZVS switch 1020 includes an example gate terminal 1052, and example drain terminal 1054, and an example source terminal 1056. In examples disclosed herein, the drain terminal 1054 and/or the source terminal 1056 may be referred to as respective current terminals. In the topology of FIG. 10, the gate terminal 1052 is coupled to output terminal 1050 the logic gate 1018, the drain terminal 1054 is coupled to the switch voltage node 1005, and the source terminal 1056 is coupled to the reference rail 1034. The ZVS switch 1020 is an NMOS device that is physically smaller than the switching device 1004. For example, when conducting, the ZVS switch 1020 conducts a small amount of current (e.g., 1 milliampere, etc.) compared to the first switching device 1004 that conducts a large amount of current (e.g., 1 ampere, 5 amperes, etc.). The ZVS switch 1020 is coupled in parallel with the diode 1006 to conduct a negative current (e.g., negative 1 milliamperes) with respect to the polarity of the current conducting through the inductor 1010. In operation, when the switching device 1004 is enabled a negative current (e.g., 1 milliampere) will conduct from the drain terminal 1054 to the source terminal 1056.

In addition, by generating the peak threshold signal (line 1027) when the voltage at the switch voltage node 1005 (e.g., the voltage at the drain terminal 1054) is at a trough (e.g., the ringing trough of the switch capacitance 1008), the topology of FIG. 10 ensures the ZVS switch 1020 may be enabled when there is a minimal voltage drop (e.g., 0 volts) from the drain terminal 1054 to the source terminal 1056.

In the example of FIG. 10, the controller 1028 generates the peak threshold signal (line 1027) for a threshold duration. In such examples disclosed herein, the threshold duration may be calculated by the controller 1028. The threshold duration may correspond to the length of time in which to enable the ZVS switch 1020. Additionally or alternatively, any suitable method of determining the threshold duration (e.g., conduction time and/or current conduction amount) with respect to the ZVS switch 1020 may be used.

In the example of FIG. 10, the controller 1028 controls the enable signal (line 1013) for the switching device 1004. As described above, the controller 1028 enables and disables the switching device 1004 to control current conducting though the buck converter system 1000. In examples disclosed herein, the controller 1028 operates as a full ZVS controller.

In addition, the controller 1028 is coupled to the compensation network 1001 to provide the example peak threshold signal (line 1027). The controller provides the peak threshold signal (line 1027) for a length of time determined based on, at least, the input voltage, the output voltage, the inductance of the inductor 1010. In examples disclosed herein, the controller 1028 generates the peak threshold signal (line 1027) when the magnitude of the voltage at the switch voltage node 1005 is at a trough (e.g., falling edge). The controller 1028 may be implemented using hardware logic, machine readable instructions, hardware implemented state machines, etc., and/or a combination thereof.

In FIG. 10, the load 1058 is a resistive load coupled to the output voltage node 1007 and the example reference rail 1034. In the example of FIG. 10, the load 1058 is coupled to the output voltage node 1007 to obtain and/or otherwise consume the voltage and/or current provided via the buck converter system 1000. In other examples disclosed herein, the load 1058 may be any other suitable load (e.g., capacitive load, inductive load, capacitive-inductive load, etc.,) utilized in any suitable electrical system. For example, the load 1058 may be traction inverter in an electric vehicle (EV), a hybrid electric vehicle (HEV), or a load in any suitable power electronic application.

In an example operation of the buck converter system 1000, when the switching device 1004 is enabled (e.g., turned on or conducting), the input voltage is applied to the inductor 1010 and to the output node 1007, thereby causing the inductor current to increase. After the current in the inductor 1010 increases to a desired value, the switching device 1004 is disabled (e.g., turned off or not conducting). As a result, the inductor current discharges into the load 1058. The current through the inductor 1010 discharges until reaching zero amperes.

After the current in the inductor 1010 discharges to zero amperes and the diode 1006 no longer conducts, the switch capacitance 1008 will resonate with the inductor 1010 and the voltage across the switch capacitance 1008 will ring from the input voltage (e.g., the input voltage) to zero. If the output voltage (e.g., the voltage at the output voltage node 1007) is less than half of the voltage of the input voltage source 1002, then the voltage at the switch voltage node 1005 rings to voltage equal to the input voltage source 1002, thereby allowing the turn on of the switching device 1004 with zero volts across it. In such a scenario, switching losses of the switching device 1004 are eliminated or substantially reduced.

If the output voltage (e.g., the voltage at the output voltage node 1007) is greater than half of the voltage of the input voltage source 1002, then the voltage at the switch voltage node 1005 (e.g., the voltage at the drain terminal 1054 of the ZVS switch 1020) will not ring to a voltage equal to the input voltage. In such a scenario, the ZVS switch 1020 is turned on to allow current to flow from the output voltage node 1007, through the inductor 1010, and to the input voltage source 1002. The ZVS switch 1020 may be allowed to conduct long enough to create sufficient current in the inductor 1010 to completely, or substantially, discharge the voltage of the switch capacitance 1008 when the ZVS switch 1020 is turned off. The ZVS switch 1020 is enabled only if the output voltage (e.g., the voltage at the output voltage node 1007) is greater than half of the voltage of the input voltage source.

Furthermore, switching losses of the ZVS switch 1020 can be minimized by enabling (e.g., turning on) the ZVS switch 1020 with a minimal drain-to-source voltage ($V_{DS}$). This can be achieved by turning it on at the valley of the resonant ring (i.e., when the voltage across the ZVS switch 1020 reaches a minimum value).

Figure 11:
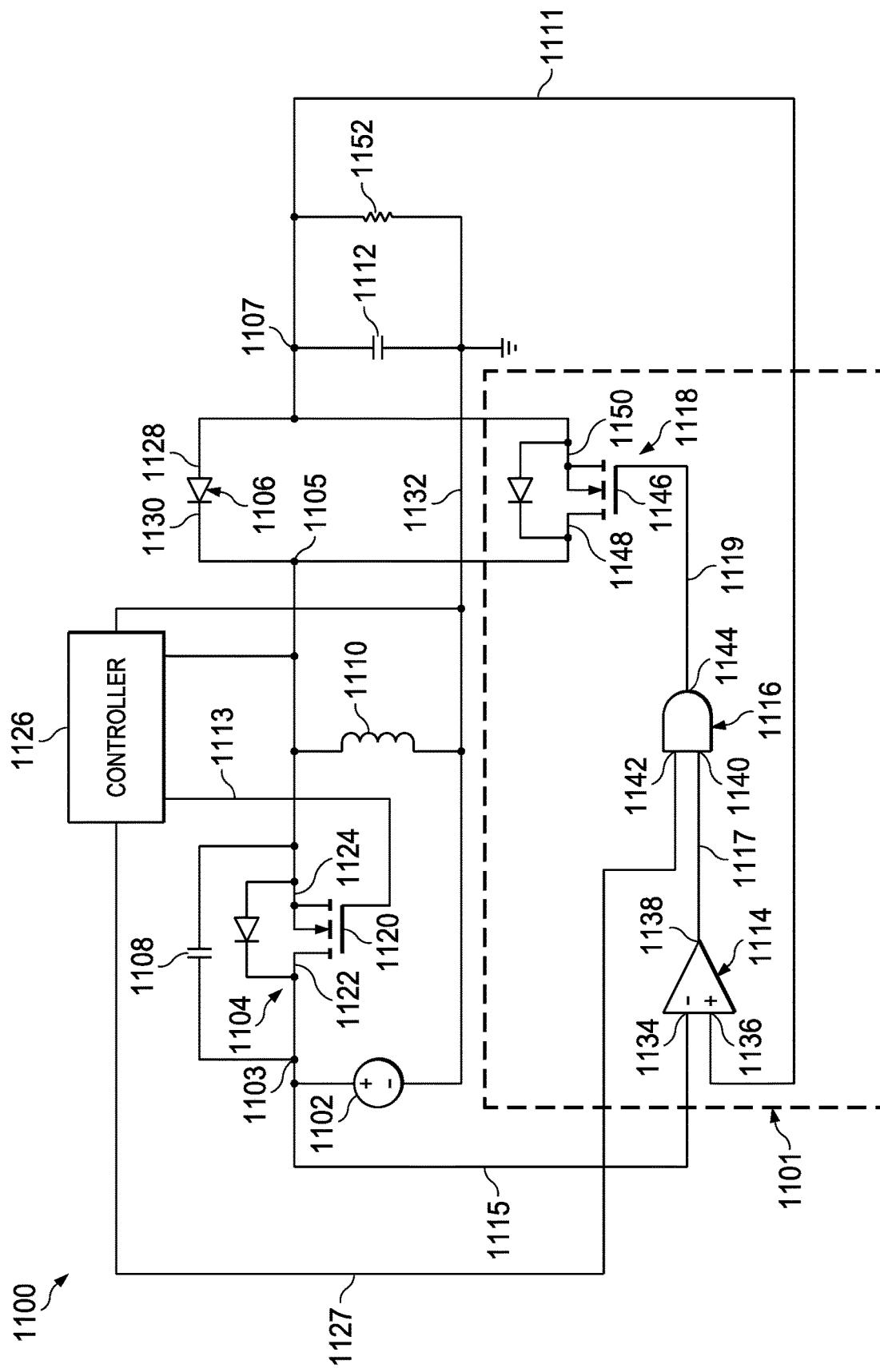
FIG. 11 is a schematic illustration of an example buck-boost converter system coupled to an example compensation network to reduce switching loss in the buck-boost converter system.

FIG. 11 is a schematic illustration of an example buck-boost converter system 1100 including an example compensation network 1101 to reduce switching loss in the buck-boost converter system 1100. The buck-boost converter system 1100 includes an example input voltage source 1102, an example switching device 1104, an example diode 1106, an example switch capacitance 1108, an example inductor 1110, and an example capacitor 1112. The buck-boost converter system 1100 also includes an example load 1152. Moreover, the compensation network 1101 includes an example comparator 1114, an example logic gate 1116, and an example enable switch 1118.

Illustrated in the example of FIG. 11, the compensation network 1101 is coupled to an example input voltage node 1103 (e.g., input node), an example switch voltage node 1105, and an example output voltage node 1107 (e.g., output node). In FIG. 11, the compensation network 1101 is coupled to the input voltage node 1103 to obtain an example input voltage signal (line 1115). Additionally, the compensation network 1101 is coupled to the output voltage node 1107 to obtain an example output voltage signal (line 1111). The compensation network 1101 may be implemented using hardware logic, machine readable instructions, hardware implemented state machines, etc., and/or a combination thereof. The operation of the compensation network 1101 is explained in further detail below, in connection with the components included in the compensation network 1101.

In FIG. 11, the input voltage source 1102 provides a direct current (DC) voltage to the buck-boost converter system 1100. In other examples disclosed herein, the input voltage source 1102 may provide a rectified AC voltage to the buck-boost converter system 1100. The input voltage source 1102 may be implemented using any suitable voltage source (e.g., battery, output of a transformer, etc.).

In the example of FIG. 11, the switching device 1104 is an n-channel metal-oxide-semiconductor field-effect transistor (NMOS). The switching device 1104 includes an example gate terminal 1120, and example drain terminal 1122, and an example source terminal 1124. In FIG. 11, the gate terminal 1120 of the switching device 1104 is coupled to an example controller 1126, the drain terminal 1122 of the switching device 1104 is coupled to the input voltage node 1103, and the source terminal 1124 of the switching device 1104 is coupled to the switch voltage node 1105. In other examples disclosed herein, the switching device 1104 may be any suitable switching device (e.g., p-channel metal-oxide-semiconductor field-effect transistor (PMOS), a high electron mobility transistor (HEMT), bi-polar junction transistor (BJT), a diode, a transistor produced using silicon substrate, a gallium nitride transistor and/or switching device, etc.).

In the example of FIG. 11, the diode 1106 includes an example anode terminal 1128 and example cathode terminal 1130. In FIG. 11, the cathode terminal 1130 terminal of the diode 1106 is coupled to the switch voltage node 1105 and the anode terminal 1128 of the diode 1106 is coupled to the output voltage node 1107. In other examples disclosed herein, the diode 1106 may be any suitable switching device (e.g., PMOS, NMOS, a high electron mobility transistor (HEMT), bi-polar junction transistor (BJT), a transistor produced using silicon substrate, a gallium nitride transistor and/or switching device, etc.) utilized as a rectifying device for the buck-boost converter system 1100.

In the example illustration of FIG. 11, the switch capacitance 1108 represents the inherent drain-to-source capacitance of the switching device 1104 and/or any stray capacitance of devices coupled to the switching device 1104.

In FIG. 11, the inductor 1110 is coupled to the switch voltage node 1105 and to an example reference rail 1132. The capacitor 1112 is coupled to the output voltage node 1107 and to the reference rail 1132. The buck-boost converter system 1100 may include components (e.g., capacitors, inductors, inductive elements, capacitive elements, etc.) that, when driven by the controller 1126 convert the voltage at the input voltage node 1103 to a desired output voltage at the output voltage node 1107.

In the example illustrated in FIG. 11, the comparator 1114 includes an example first input terminal 1134, an example second input terminal 1136, and an example output terminal 1138. In FIG. 11, the first input terminal 1134 of the comparator 1114 is coupled to the input voltage node 1103 and the second input terminal 1136 of the comparator 1114 is coupled to the output voltage node 1107. The comparator 1114 compares the voltage at the input voltage node 1103 with the voltage at the output voltage node 1107. The buck-boost converter system 1100 can increase or decrease the voltage at the output voltage node 1107 with respect to the voltage at the input voltage node 1103. In operation, the comparator 1114 generates an example trigger signal (line 1119) in response to determining the input voltage signal (line 1115) is greater than the output voltage signal (line 1111). Therefore, the operation of the compensation network 1101 is enabled when the comparator 1114 determines the input voltage signal (line 1115) is greater than the output voltage signal (line 1111).

In FIG. 11, the logic gate 1116 an example first input terminal 1140, an example second input terminal 1142, and an example output terminal 1144. In FIG. 11, the first input terminal 1140 of the logic gate 1116 is coupled to the output terminal 1138 of the comparator 1114, the second input terminal 1142 of the logic gate 1116 is coupled to the controller 1126, and the output terminal 1144 of the logic gate 1116 is coupled to an example gate terminal 1146 of the enable switch 1118. In the topology illustrated in FIG. 11, the logic gate 1116 is a logic-AND gate. Additionally or alternatively, the logic gate 1116 may be any suitable logic gate utilized to obtain the indication signal (line 1117) and generate an example trigger signal (line 1119). In operation, the logic gate 1116 provides trigger signal (line 11119) in response to determining the indication signal (line 1117) is a logic-high signal and an example peak threshold signal (line 1127) is a logic-high signal. In examples disclosed herein, the peak threshold signal (line 1127) is generated by the controller 1126, in response to the controller 1126 monitoring the voltage at the switch voltage node 1105 is at a peak (e.g., the ringing peak of the switch capacitance 1108).

In the example illustrated in FIG. 11, the enable switch 1118 includes the gate terminal 1146, and example drain terminal 1148, and an example source terminal 1150. In examples disclosed herein, the drain terminal 1148 and/or the source terminal 1150 may be referred to as respective current terminals. In the topology of FIG. 11, the gate terminal 1146 is coupled to the output terminal 1144 of the logic gate 1116, the drain terminal 1148 is coupled to the switch voltage node 1105, and the source terminal 1150 is coupled to the output voltage node 1107. The enable switch 1118 is an NMOS device that is physically smaller than the switching device 1104. For example, when conducting, the enable switch 1118 conducts a small amount of current (e.g., 1 milliampere) compared to the first switching device 1104 that conducts a large amount of current (e.g., 1 ampere, 5 amperes, etc.). The enable switch 1118 is coupled in parallel with the diode 1106 to conduct a negative current (e.g., negative 1 milliamperes) with respect to the polarity of the current conducting through the inductor 1110. In operation, when the enable switch 1118 is enabled, a small current (e.g., 1 milliampere, etc.) will conduct from the drain terminal 1123 to the source terminal 1125.

In addition, by generating the peak threshold signal (line 1127) when the voltage at the switch voltage node 1105 (e.g., the voltage at the drain terminal 1148) is at a peak (e.g., the ringing peak of the switch capacitance 1108), the topology of FIG. 11 ensures the enable switch 1118 may be enabled when there is a minimal voltage drop (e.g., 0 volts) from the drain terminal 1148 to the source terminal 1150.

If the buck-boost converter system 1100 is producing an output voltage signal (line 1111) greater than the input voltage signal (line 1115), than the threshold duration of the negative current conducting through the enable switch 1118 may be determined in a manner similar to FIG. 3. Additionally or alternatively, if the buck-boost converter system 1100 is producing an output voltage signal (line 1111) less than the input voltage signal (line 1115), then the threshold duration of the current conducting through the enable switch 1118 may be determined in a manner similar to FIG. 10. Alternatively, any suitable method of determining the threshold duration may be used.

In the example of FIG. 11, the controller 1126 controls the enable signal (line 1113) for the switching device 1104. As described above, the controller 1126 enables and disables the switching device 1104 to control current conducting though the buck-boost converter system 1100. In examples disclosed herein, the controller 1126 operates as a full ZVS controller. In FIG. 11, the controller 1126 may act in accordance as the controller illustrated in FIG. 3 and/or FIG. 10 (e.g., the controller 318 and/or the controller 1028). The controller 1126 may be implemented using hardware logic, machine readable instructions, hardware implemented state machines, etc., and/or a combination thereof.

In FIG. 11, the load 1152 is a resistive load coupled to the output voltage node 1107 and an example reference rail 1132. In the example of FIG. 11, the load 1152 is coupled to the output voltage node 1107 to obtain and/or otherwise consume the voltage and/or current provided via the buck-boost converter system 1100. In other examples disclosed herein, the load 1152 may be any other suitable load (e.g., capacitive load, inductive load, capacitive-inductive load, etc.,) utilized in any suitable electrical system. For example, the load 1152 may be traction inverter in an electric vehicle (EV), a hybrid electric vehicle (HEV), or a load in any suitable power electronic application.

In addition, the controller 1126 is coupled to the compensation network 1101 to provide the example peak threshold signal (line 1127). The controller 1126 provides the peak threshold signal (line 1127) for a length of time determined based on at least the input voltage, the output voltage, the inductance of the inductor 1110. In examples disclosed herein, the controller 1126 generates the peak threshold signal (line 1127) when the voltage at the switch voltage node 1105 is at a peak (e.g., rising edge). The controller 1126 may be implemented using hardware logic, machine readable instructions, hardware implemented state machines, etc., and/or a combination thereof.

In an example operation of the buck-boost converter system 1100, when the switching device 1104 is enabled (e.g., turned on or conducting), thereby causing the inductor current to increase. After the current in the inductor 1110 increases to a desired value, the switching device 1104 is disabled (e.g., turned off or not conducting). As a result, the inductor current discharges into the load 1152. The current through the inductor 1110 discharges until reaching zero amperes.

After the current in the inductor 1110 discharges to zero amperes and the diode 1106 no longer conducts, the switch capacitance 1108 will resonate with the inductor 1110 and the voltage across the switch capacitance 1108 will ring from a voltage equal to the input voltage (e.g., the voltage of the input voltage source 1102) plus the output voltage (e.g., the voltage at the output voltage node 1107) towards zero volts. If the output voltage (e.g., the voltage at the output voltage node 1107) is greater than the voltage of the input voltage source 316, then the voltage across the switch capacitance 1108 will ring to zero, thereby allowing the turn on of the switching device 1104 with zero volts across it. In such a scenario, switching losses of the switching device 1104 are eliminated or substantially reduced.

If the output voltage (e.g., the voltage at the output voltage node 1107) is less than the voltage of the input voltage source 1102, then the voltage across the switch capacitance 1108 will not ring to zero volts. In such a scenario, the ZVS switch 1118 is turned on to allow current to flow from the output voltage node 1107, through the ZVS switch 1118, and through the inductor 1110. The ZVS switch 1118 may be allowed to conduct long enough to create sufficient current in the inductor 1110 to completely, or substantially, discharge the voltage of the switch capacitance 1108 when the ZVS switch 1118 is turned off. The ZVS switch 1118 is enabled if the voltage of the input voltage source 1102 is greater than the output voltage (e.g., the voltage at the output voltage node 1107).

Furthermore, switching losses of the ZVS switch 1118 can be minimized by enabling (e.g., turning on) the ZVS switch 1118 with a minimal drain-to-source voltage ($V_{DS}$). This can be achieved by turning it on at the peak of the resonant ring.

While an example manner of implementing the compensation network 302 of FIG. 3, the compensation network 1001 of FIG. 10, and/or the compensation network 1101 of FIG. 11 is illustrated in FIGS. 3, 10, and/or 11, one or more of the elements, processes and/or devices illustrated in FIGS. 3, 10, and/or 11 may be combined, divided, re-arranged, omitted, eliminated and/or implemented in any other way. Further, the example comparator 320, the example logic gate 322, the example ZVS switch 324, the example first resistor 326, the example second resistor 328 and/or, more generally, the example compensation network 302 of FIG. 3, the example reference determiner 1014, the example comparator 1016, the example logic gate 1018, the example ZVS switch 1020, and/or, more generally, the example compensation network 1002 of FIG. 10, the example comparator 1114, the example logic gate 1116, the example enable switch 1118, and/or, more generally, the example compensation network 1102 of FIG. 11, may be implemented by hardware, software, firmware and/or any combination of hardware, software and/or firmware. Thus, for example, any the example comparator 320, the example logic gate 322, the example ZVS switch 324, the example first resistor 326, the example second resistor 328 and/or, more generally, the example compensation network 302 of FIG. 3, the example reference determiner 1014, the example comparator 1016, the example logic gate 1018, the example ZVS switch 1020, and/or, more generally, the example compensation network 1002 of FIG. 10, the example comparator 1114, the example logic gate 1116, the example enable switch 1118, and/or, more generally, the example compensation network 1102 of FIG. 11 could be implemented by one or more analog or digital circuit(s), logic circuits, programmable processor(s), programmable controller(s), graphics processing unit(s) (GPU(s)), digital signal processor(s) (DSP(s)), application specific integrated circuit(s) (ASIC(s)), programmable logic device(s) (PLD(s)) and/or field programmable logic device(s) (FPLD(s)). When reading any of the apparatus or system claims of this patent to cover a purely software and/or firmware implementation, at least one of the example comparator 320, the example logic gate 322, the example ZVS switch 324, the example first resistor 326, the example second resistor 328 and/or, more generally, the example compensation network 302 of FIG. 3, the example reference determiner 1014, the example comparator 1016, the example logic gate 1018, the example ZVS switch 1020, and/or, more generally, the example compensation network 1002 of FIG. 10, the example comparator 1114, the example logic gate 1116, the example enable switch 1118, and/or, more generally, the example compensation network 1102 of FIG. 11 is/are hereby expressly defined to include a non-transitory computer readable storage device or storage disk such as a memory, a digital versatile disk (DVD), a compact disk (CD), a Blu-ray disk, etc. including the software and/or firmware. Further still, the example compensation network 302 of FIG. 3, the example compensation network 1001 of FIG. 10, and/or the example compensation network 1101 of FIG. 11 may include one or more elements, processes and/or devices in addition to, or instead of, those illustrated in FIGS. 3, 10, and/or 11, and/or may include more than one of any or all of the illustrated elements, processes and devices. As used herein, the phrase "in communication," including variations thereof, encompasses direct communication and/or indirect communication through one or more intermediary components, and does not require direct physical (e.g., wired) communication and/or constant communication, but rather additionally includes selective communication at periodic intervals, scheduled intervals, aperiodic intervals, and/or one-time events.

Figure 12:
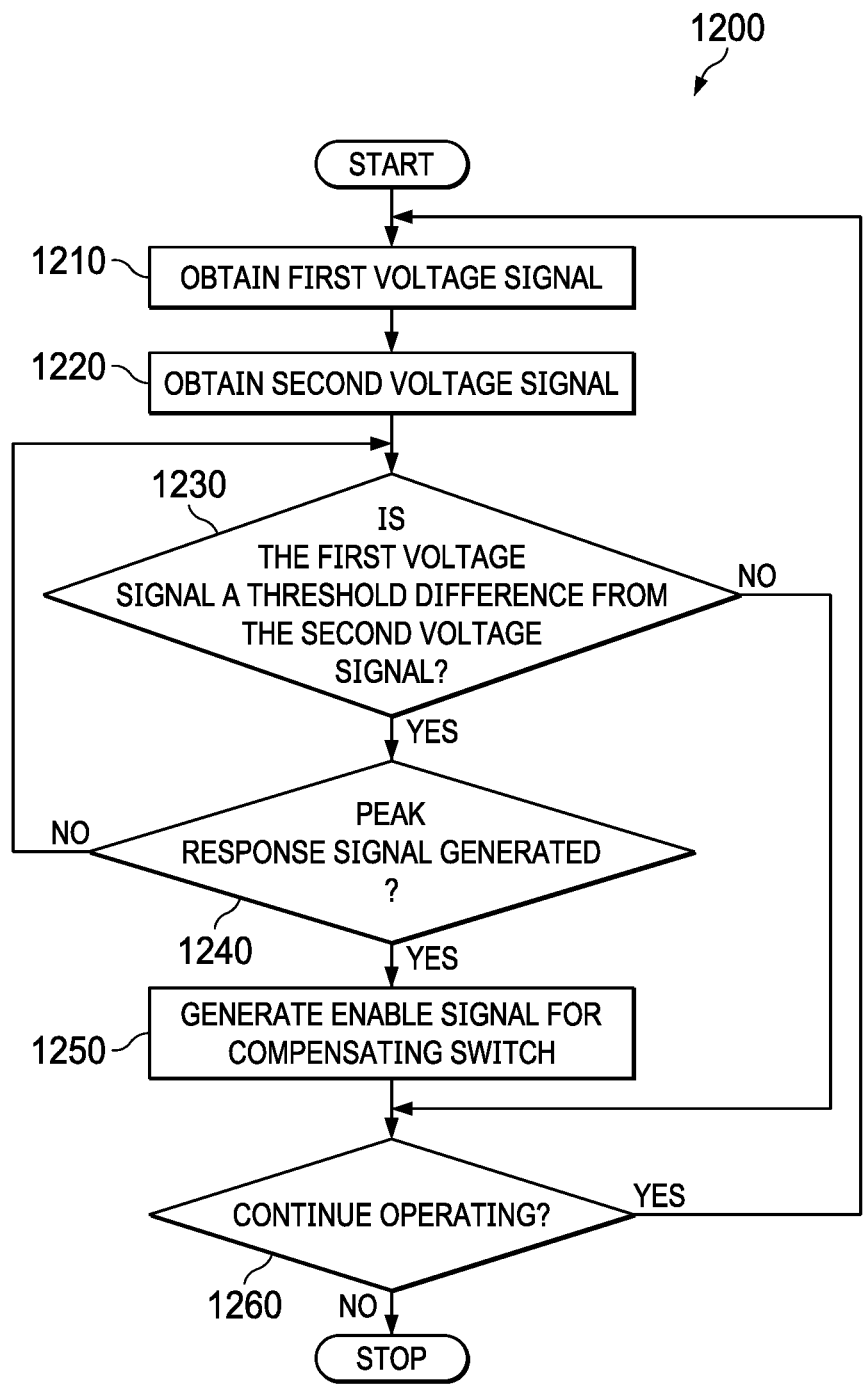
FIG. 12 is a flowchart representative of a process that may be implemented using logic or machine readable instructions that may be executed to implement the compensation network of FIG. 3, the compensation network of FIG. 10, or the compensation network of FIG. 11, to reduce switching losses occurring in the boost converter system, the buck converter system, or the buck-boost converter system.

A flowchart representative of example hardware logic, machine readable instructions, hardware implemented state machines, and/or any combination thereof for implementing the compensation network 302 of FIG. 3, the compensation network 1001 of FIG. 10, and/or the compensation network 1101 of FIG. 11 is shown in FIG. 12. The machine readable instructions may be one or more executable programs or portion(s) of an executable program for execution by one or more computer processors, one or more microcontrollers, etc. For example, the machine readable instructions may be executed by one or more integrated circuits, logic circuits, microprocessors, GPUs, DSPs, or controllers from any desired family or manufacturer. For example, the one or more integrated circuits, logic circuits, microprocessors, GPUs, DSPs, or controllers may be semiconductor based (e.g., silicon based) device(s). The program may be embodied in software stored on a non-transitory computer readable storage medium such as non-volatile memory, volatile memory, etc., associated with the one or more computer processors, the one or more microcontrollers, etc., but the entire program and/or parts thereof could alternatively be executed by a device other than the one or more computer processors, the one or more microcontrollers, etc., and/or embodied in firmware or dedicated hardware. Further, although the example program is described with reference to the flowchart illustrated in FIG. 12, many other methods of implementing the example compensation network 302 of FIG. 3, the example compensation network 1001 of FIG. 10, and/or the example compensation network 1101 of FIG. 11 may alternatively be used. For example, the order of execution of the blocks may be changed, and/or some of the blocks described may be changed, eliminated, or combined. Additionally or alternatively, any or all of the blocks may be implemented by one or more hardware circuits (e.g., discrete and/or integrated analog and/or digital circuitry, an FPGA, an ASIC, a comparator, an operational-amplifier (op-amp), a logic circuit, etc.) structured to perform the corresponding operation without executing software or firmware.

The machine readable instructions described herein may be stored in one or more of a compressed format, an encrypted format, a fragmented format, a packaged format, etc. Machine readable instructions as described herein may be stored as data (e.g., portions of instructions, code, representations of code, etc.) that may be utilized to create, manufacture, and/or produce machine executable instructions. For example, the machine readable instructions may be fragmented and stored on one or more storage devices and/or computing devices (e.g., servers). The machine readable instructions may require one or more of installation, modification, adaptation, updating, combining, supplementing, configuring, decryption, decompression, unpacking, distribution, reassignment, etc. in order to make them directly readable and/or executable by a computing device and/or other machine. For example, the machine readable instructions may be stored in multiple parts, which are individually compressed, encrypted, and stored on separate computing devices, wherein the parts when decrypted, decompressed, and combined form a set of executable instructions that implement a program such as that described herein. In another example, the machine readable instructions may be stored in a state in which they may be read by a computer, but require addition of a library (e.g., a dynamic link library (DLL)), a software development kit (SDK), an application programming interface (API), etc. in order to execute the instructions on a particular computing device or other device. In another example, the machine readable instructions may need to be configured (e.g., settings stored, data input, network addresses recorded, etc.) before the machine readable instructions and/or the corresponding program(s) can be executed in whole or in part. Thus, the disclosed machine readable instructions and/or corresponding program(s) are intended to encompass such machine readable instructions and/or program(s) regardless of the particular format or state of the machine readable instructions and/or program(s) when stored or otherwise at rest or in transit.

In some examples disclosed herein, a hardware processor (e.g., the controller 318, the controller 1028, and/or the controller 1126) may be used to execute the instructions of FIG. 12 to implement the example compensation network 302 of FIG. 3, the example compensation network 1001 of FIG. 10, and/or the example compensation network 1101 of FIG. 11. The hardware processor can be, for example, a server, an electronic control unit (ECU) of a vehicle, a personal computer, a workstation, or any other type of computing device. The hardware processor may be a semiconductor based (e.g., silicon based) device. For example, the hardware processor may obtain a measurement (e.g., a current measurement, a voltage measurement, etc.) associated with the boost converter system 300, the buck converter system 1000, and/or the buck-boost converter system 1100, and/or generate a control signal that is to be obtained by the ZVS switch 324, the ZVS switch 1020, and/or the enable switch 1118. In such examples, the hardware processor can generate a control signal that is to be obtained by the ZVS switch 324, the ZVS switch 1020, and/or the enable switch 1118 to provide current or remove current from the inductor 304 of FIG. 3, the inductor 1010 of FIG. 10, and/or the inductor 1110 of FIG. 11. For example, the hardware processor may direct and/or otherwise cause the compensation network 302, the compensation network 1001, and/or the compensation network 1101 to turn off the ZVS switch 324, the ZVS switch 1020, and/or the enable switch 1118 in response to an indication of voltage in the boost converter system 300, the buck converter system 1000, and/or the buck-boost converter system 1100.

As mentioned above, the example processes of FIG. 12 may be implemented using executable instructions (e.g., computer and/or machine readable instructions) stored on a non-transitory computer and/or machine readable medium such as a hard disk drive, a flash memory, a read-only memory, a compact disk, a digital versatile disk, a cache, a random-access memory and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable storage device and/or storage disk and to exclude propagating signals and to exclude transmission media.

"Including" and "comprising" (and all forms and tenses thereof) are used herein to be open ended terms. Thus, whenever a claim employs any form of "include" or "comprise" (e.g., comprises, includes, comprising, including, having, etc.) as a preamble or within a claim recitation of any kind, it is to be understood that additional elements, terms, etc. may be present without falling outside the scope of the corresponding claim or recitation. As used herein, when the phrase "at least" is used as the transition term in, for example, a preamble of a claim, it is open-ended in the same manner as the term "comprising" and "including" are open ended. The term "and/or" when used, for example, in a form such as A, B, and/or C refers to any combination or subset of A, B, C such as (1) A alone, (2) B alone, (3) C alone, (4) A with B, (5) A with C, (6) B with C, and (7) A with B and with C. As used herein in the context of describing structures, components, items, objects and/or things, the phrase "at least one of A and B" is intended to refer to implementations including any of (1) at least one A, (2) at least one B, and (3) at least one A and at least one B. Similarly, as used herein in the context of describing structures, components, items, objects and/or things, the phrase "at least one of A or B" is intended to refer to implementations including any of (1) at least one A, (2) at least one B, and (3) at least one A and at least one B. As used herein in the context of describing the performance or execution of processes, instructions, actions, activities and/or steps, the phrase "at least one of A and B" is intended to refer to implementations including any of (1) at least one A, (2) at least one B, and (3) at least one A and at least one B. Similarly, as used herein in the context of describing the performance or execution of processes, instructions, actions, activities and/or steps, the phrase "at least one of A or B" is intended to refer to implementations including any of (1) at least one A, (2) at least one B, and (3) at least one A and at least one B.

FIG. 12 is a flowchart representative of a process 1200 that may be implemented using logic or machine readable instructions that may be executed to implement the compensation network 302 of FIG. 3, the compensation network 1001 of FIG. 10, or the compensation network 1101 of FIG. 11, to reduce switching losses occurring in the boost converter system 300, the buck converter system 1000, or the buck-boost converter system 1100, respectively. In the example illustrated in FIG. 12, a comparator (e.g., the comparator 320, the comparator 1016, or the comparator 1114) obtains a first voltage signal (e.g., the input voltage signal (line 327), the input voltage signal (line 1015), or the input voltage signal (line 1115)) (block 1210). Additionally, the comparator (e.g., the comparator 320, the comparator 1016, or the comparator 1114) obtains a second voltage signal (e.g., the output voltage signal (line 311), the output voltage signal (line 1011), or the output voltage signal (line 1111)) (block 1220).

In response, the comparator (e.g., the comparator 320, the comparator 1016, or the comparator 1114) determines whether the first voltage signal (e.g., the input voltage signal (line 327), the input voltage signal (line 1015), or the input voltage signal (line 1115)) and the second voltage signal (e.g., the output voltage signal (line 311), the output voltage signal (line 1011), or the output voltage signal (line 1111)) are a threshold difference from each other (block 1230). For example, the threshold difference may be whether the voltage of the input voltage signal (e.g., the input voltage signal (line 327)) is half the magnitude of the second voltage signal (e.g., the output voltage signal (line 311)). If the control of block 1230 returns a NO, then control proceeds to block 1260. The control of block 1260 is explained in further detail below.

Alternatively, if the control of block 1230 returns a YES, then a logic gate (e.g., the logic gate 322, the logic gate 1018, or the logic gate 1116) determines whether peak response signal (e.g., the peak threshold signal (line 329), the peak threshold signal (line 1027), or the peak threshold signal (line 1127)) is generated (block 1240). In response the control of block 1240 returning a NO, then control returns to block 1230.

Alternatively, in response the control of block 1240 returning a YES, then the logic gate (e.g., the logic gate 322, the logic gate 1018, or the logic gate 1116) generates an example enable signal (e.g., the trigger signal (line 319), the trigger signal (line 1019), or the trigger signal (line 1119)) (block 1250). In examples disclosed herein, control proceeds to block 1260 in which the compensating network (e.g., the compensation network 302, the compensation network 1001, or the compensation network 1101) determines whether to continue operating (block 1260).

If the compensating network (e.g., the compensation network 302, the compensation network 1001, or the compensation network 1101) determines to continue operating, then control returns to block 1210. Alternatively, if the compensating network (e.g., the compensation network 302, the compensation network 1001, or the compensation network 1101) determines not to continue operating, then the process stops. In examples disclosed herein, any of a loss of power, damaged, device, shutoff signal, etc., may provoke and/or otherwise cause control to stop.

From the foregoing, it will be appreciated that example methods, apparatus and articles of manufacture have been disclosed that reduces residual switching losses present in power converter systems by enabling soft switching under all operating conditions. The disclosed methods, apparatus and articles of manufacture improve the efficiency of using a computing device by providing a negative current to an inductor of a power converter system, thereby allowing a respective switching device to be enabled with zero, or substantially little, voltage across the switching device. The disclosed methods, apparatus and articles of manufacture are accordingly directed to one or more improvement(s) in the functioning of a computer.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

What is claimed is:

1. A circuit to reduce switching loss in a converter having an input voltage node, an output voltage node, an inductor coupled between the input voltage node and the output voltage node, a switch node between the inductor and the output voltage node and a first transistor coupled between the switch node and ground, the circuit comprising:
 a controller coupled to a control terminal of the first transistor and directly coupled to the input voltage node, the output voltage node and the switch node; and
 a compensation network including:
  an amplifier having an output, a first input directly coupled to the input voltage node and a second input directly coupled through a resistive divider to the output voltage node;
  a logic gate having an output, a first input coupled to the controller and a second input directly coupled to the output of the amplifier; and
  a second transistor having a control terminal directly coupled to the output of the logic gate, a first current terminal coupled to the switch node and a second current terminal coupled to the output voltage node.

2. The apparatus of claim 1, wherein the compensation is adapted to conduct a current to the converter in response to a first voltage at the input voltage node being a threshold difference than a second voltage at the output voltage node.

3. The apparatus of claim 2, wherein the controller is configured to generate an enable signal to enable the second transistor in response to a third voltage at a switch node in the converter being a peak threshold.

4. The apparatus of claim 2, wherein the threshold difference is satisfied when the first voltage is less than half of the second voltage.

5. The apparatus of claim 2, wherein the compensation network is adapted to conduct the current in parallel with a rectifying device in the converter.

6. The apparatus of claim 2, wherein the current is adapted to conduct through the second transistor, wherein the second transistor is smaller than the first transistor, and wherein current conducts through the second transistor when a first voltage at a first current terminal of the second transistor is equivalent to a second voltage at a second current terminal of the second transistor.

7. The apparatus of claim 1, wherein the converter is a boost converter.

8. A system comprising:
 a converter including a first transistor, an input node, an output node, and a switch node;
 a controller coupled to a control terminal of the first transistor and directly coupled to the input node, the output node and the switch node;

a compensation network including a second transistor, the compensation network is directly coupled to the input node, to the output node, and to the controller, and wherein the second transistor is coupled to the switch node and to the output node; and wherein the second transistor is configured to conduct a current in response to a first voltage at the input node being a threshold difference from a second voltage at the output node.

9. The system of claim 8, wherein the threshold difference is satisfied when the first voltage is less than half of the second voltage.

10. The system of claim 8, wherein the second transistor is adapted to conduct a current when a first voltage the switch node is equivalent to a second voltage at the output node.

11. The system of claim 8, wherein the second transistor is smaller than the first switch.

12. The system of claim 8, wherein the converter is a boost converter.

13. A converter for converting an input voltage at an input node to an output voltage at an output node, the converter having an inductor coupled between the input node and a switching node and the converter comprising:

a first transistor coupled between the switching node and ground;

a diode having an anode coupled to the switching node and a cathode coupled to the output node;

a controller directly coupled to the input node, the switching node and the output node, the controller having an output coupled to a control terminal of the first transistor;

a compensation network directly coupled to the input node and the output node through a resistive divider and having a ZVS switch with a first current terminal coupled to the anode of the diode and a second current terminal coupled to the cathode of the diode; and wherein the ZVS switch is adapted to conduct current from the from the second current terminal to the first current terminal.

\* \* \* \* \*